(12) United States Patent
Kim et al.

(10) Patent No.: US 10,825,228 B2
(45) Date of Patent: Nov. 3, 2020

(54) ELECTRONIC APPARATUS FOR GENERATING ANIMATED MESSAGE BY DRAWING INPUT

(71) Applicant: Samsung Electronics Co., Ltd., Gyeonggi-do (KR)

(72) Inventors: Keunsoo Kim, Gyeonggi-do (KR); Banghyun Kwon, Gyeonggi-do (KR); Jeonghoon Kim, Gyeonggi-do (KR); Jiwoo Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/507,946

(22) Filed: Jul. 10, 2019

(65) Prior Publication Data

US 2020/0051307 A1 Feb. 13, 2020

(30) Foreign Application Priority Data

Aug. 8, 2018 (KR) .................. 10-2018-0092702

(51) Int. Cl.
*G06T 13/80* (2011.01)
*G06F 3/0488* (2013.01)
(Continued)

(52) U.S. Cl.
CPC .......... *G06T 13/80* (2013.01); *G06F 3/04883* (2013.01); *G06T 11/60* (2013.01); *G06T 2200/24* (2013.01); *H04L 51/10* (2013.01)

(58) Field of Classification Search
CPC .. G06F 3/04883; G06F 3/03545; G06T 11/60; G06T 11/00; G06T 13/00; H04L 51/04; H04L 51/10; H04M 1/72552
See application file for complete search history.

(56) References Cited

U.S. PATENT DOCUMENTS 8,004,529 B2 8/2011 Wood et al.
8,594,740 B2 11/2013 Wang et al.
(Continued)

FOREIGN PATENT DOCUMENTS

JP 2009-193145 8/2009
KR 10-2013-0094401 8/2013
(Continued)

OTHER PUBLICATIONS

International Search Report dated Oct. 2, 2019 issued in counterpart application No. PCT/KR2019/007051, 11 pages.

*Primary Examiner* — Koosha Sharifi-Tafreshi
(74) *Attorney, Agent, or Firm* — The Farrell Law Firm, P.C.

(57) ABSTRACT

An electronic apparatus is provided, which includes a housing, a touchscreen display, a wireless communication circuit, a processor operatively connected to the touchscreen display and the wireless communication circuit, and a memory operatively connected to the processor. The memory stores instructions that, when executed, instruct the processor to receive an input to select a first animated image object, via the touchscreen display, to play a first animation of the first animated image object on the touchscreen display at least once, to receive a drawing input overlapping with the first animated image object, via the touchscreen display on which the first animation is played, and to cause a third animated image object, which is obtained by composing a second animation of a second animated image object by the drawing input with the first animation, to be generated. The third animated image object includes a plurality of image frames obtained by synchronizing the first animation and the second animation based on a time point when the drawing input is entered.

20 Claims, 23 Drawing Sheets

(51) Int. Cl.
*G06T 11/60* (2006.01)
*H04L 12/58* (2006.01)

(56) References Cited

U.S. PATENT DOCUMENTS

| | | | |
|---|---|---|---|
| 8,775,526 | B2 | 7/2014 | Lorch et al. |
| 8,878,855 | B2 | 11/2014 | Casanova et al. |
| 9,172,906 | B2 | 10/2015 | Wang et al. |
| 9,374,449 | B2 | 6/2016 | Kim et al. |
| 9,600,803 | B2 | 3/2017 | Greenberg et al. |
| 9,612,739 | B2 | 4/2017 | Large et al. |
| 9,639,962 | B2 | 5/2017 | Chang et al. |
| 9,965,878 | B2 | 5/2018 | Wang et al. |
| 10,129,385 | B2 | 11/2018 | Kim et al. |
| 10,204,437 | B2 | 2/2019 | Moore et al. |
| 2009/0089710 | A1 | 4/2009 | Wood et al. |
| 2009/0312065 | A1 | 12/2009 | Wang et al. |
| 2010/0179991 | A1 | 7/2010 | Lorch et al. |
| 2011/0037767 | A1 | 2/2011 | Casanova et al. |
| 2011/0181619 | A1* | 7/2011 | Kwon ............... H04M 1/72555 345/629 |
| 2013/0038613 | A1* | 2/2013 | Kim ........................ G06T 13/80 345/473 |
| 2013/0201112 | A1 | 8/2013 | Large et al. |
| 2013/0215151 | A1 | 8/2013 | Chang et al. |
| 2014/0043427 | A1 | 2/2014 | Wang et al. |
| 2014/0147100 | A1 | 5/2014 | Bakharov et al. |
| 2014/0325000 | A1 | 10/2014 | Lorch et al. |
| 2015/0026279 | A1 | 1/2015 | Casanova et al. |
| 2016/0042547 | A1 | 2/2016 | Wang et al. |
| 2016/0283088 | A1 | 9/2016 | Greenberg et al. |
| 2016/0323436 | A1 | 11/2016 | Kim et al. |
| 2017/0229147 | A1 | 8/2017 | McKaskle et al. |
| 2017/0358114 | A1* | 12/2017 | Tennant ................. G06K 9/222 |
| 2018/0047200 | A1 | 2/2018 | O'Hara et al. |
| 2018/0053530 | A1 | 2/2018 | Moore et al. |
| 2018/0232927 | A1 | 8/2018 | Wang et al. |

FOREIGN PATENT DOCUMENTS

| | | |
|---|---|---|
| KR | 10-2016-0045535 | 4/2016 |
| KR | 10-1658239 | 9/2016 |
| KR | 10-2017-0000375 | 1/2017 |
| KR | 10-2017-0017852 | 2/2017 |
| KR | 10-1739589 | 5/2017 |
| KR | 10-1868637 | 6/2018 |

* cited by examiner

ELECTRONIC APPARATUS FOR GENERATING ANIMATED MESSAGE BY DRAWING INPUT

CROSS-REFERENCE TO RELATED APPLICATION(S)

This application is based on and claims priority under 35 U.S.C. § 119 to Korean Patent Application No. 10-2018-0092702, filed on Aug. 8, 2018, in the Korean Intellectual Property Office, the disclosure of which is incorporated by reference herein in its entirety.

BACKGROUND

1. Field

The disclosure relates generally to a technology for generating an animated message by a drawing input.

2. Description of Related Art

A mobile device is a device that includes one or more functions to perform voice and video calls, to input or output information, and to store data.

As functions on a mobile device are diversified, more complicated functions are introduced, such as capturing photos and videos, playing music files, playing video files, playing games, receiving broadcasting data, and connecting to wireless Internet. In addition, the mobile device may provide a user with a service that transmits or receives a message including media content, such as an image or a video image.

SUMMARY

The present disclosure has been made to address the above-mentioned problems and disadvantages, and to provide at least the advantages described below.

In accordance with an aspect of the present disclosure, an electronic apparatus is provided, which includes a housing, a touchscreen display visible or exposed, through a portion of the housing, a wireless communication circuit positioned inside the housing, a processor positioned inside the housing and operatively connected to the touchscreen display and the wireless communication circuit, and a memory positioned inside the housing and operatively connected to the processor. The memory may store instructions that, when executed, cause the processor to receive an input to select a first animated image object, via the touchscreen display, to play a first animation of the first animated image object on the touchscreen display at least once, to receive a drawing input overlapping with the first animated image object, via the touchscreen display on which the first animation is played, and to cause a third animated image object, which is obtained by composing a second animation of a second animated image object by the drawing input with the first animation, to be generated. The third animated image object may include a plurality of image frames obtained by synchronizing the first animation and the second animation based on a time point when the drawing input is entered.

In accordance with another aspect of the present disclosure, an electronic apparatus is provided, which includes a housing, a touchscreen display visible or exposed, through a portion of the housing, a wireless communication circuit positioned inside the housing, a processor positioned inside the housing and operatively connected to the touchscreen display and the wireless communication circuit, and a memory positioned inside the housing and operatively connected to the processor. The memory may store instructions that, when executed, cause the processor to receive an input to select a first animated image object, via the touchscreen display, to play a first animation of the first animated image object on the touchscreen display at least once, to receive a drawing input overlapping with the first animated image object, via the touchscreen display on which the first animation is played, and to cause a third animated image object, which is obtained by composing a second animation of a second animated image object by the drawing input with the first animation, to be generated. The third animated image object may include a plurality of image frames that are obtained by synchronizing the first animation and the second animation based on a playback time of the first animation.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
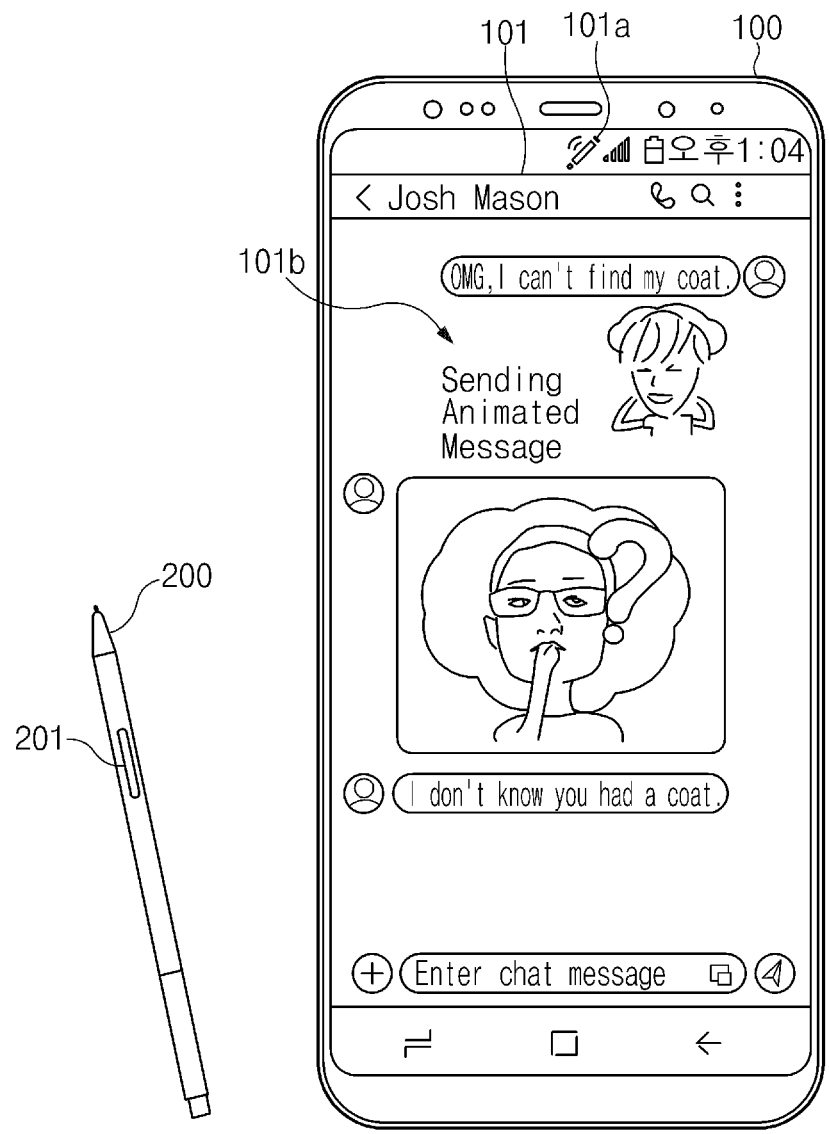
FIG. 1 illustrates an electronic apparatus including a digital pen, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

FIG. 1 illustrates an electronic apparatus including a digital pen, according to an embodiment.

Referring to FIG. 1, an electronic apparatus 100 includes a digital pen (or a stylus pen) 200.

The electronic apparatus 100 may receive a user input using the digital pen 200. For example, the electronic apparatus 100 may receive a touch input or a hovering input using the digital pen 200. As such, the electronic apparatus 100 may receive a drawing input as well as a selection input or a drag input using the digital pen 200. The electronic apparatus 100 may indicate the connection state with the digital pen 200, via an indicator 101a included in a status bar.

The electronic apparatus 100 may receive a user input (or a button input) via a button 201 included in the digital pen 200. The electronic apparatus 100 may receive a signal corresponding to the button input via wireless communication with the digital pen 200. The electronic apparatus 100 may perform a specified function corresponding to the received signal. For example, the electronic apparatus 100 may perform a specified operation (e.g., playing or stopping content) of the executed app. As such, a user may control the electronic apparatus 100, using the button 201 of the digital pen 200.

The electronic apparatus 100 may provide a message service. In other words, the electronic apparatus 100 may transmit or receive a message to or from an external electronic apparatus. For example, the message service may include short message service (SMS), long messaging service (LMS), and multimedia messaging service (MMS). The electronic apparatus 100 may provide a message service via an app (or an application program). The electronic apparatus 100 may display a GUI 101 of the executed app on a display and may display the transmitted or received message 101b on a GUI 101. Accordingly, the electronic apparatus 100 may provide a message service.

The electronic apparatus 100 may transmit or receive the message including multimedia content, e.g., an image or a video image together with a text. The electronic apparatus 100 may generate an animated message including an animated image object which may include a plurality of image frames of the animated image object. The electronic apparatus 100 (or an electronic apparatus that receives a message) may represent the change in an image object by sequentially displaying the plurality of image frames included in the animated image object on the display. In other words, the electronic apparatus 100 may play the animation of the animated image object. Hereinafter, the animation may be referred to as a "video image".

The electronic apparatus 100 may generate a message including an image, e.g., an animated image object or an image generated in response to a user input. The electronic apparatus 100 may generate an animated message including the animated image object from the received drawing input. The user input may be a drawing input using a part of a user's body (e.g., a finger) or the digital pen 200. The electronic apparatus 100 may generate a message including the image generated by synthesizing a plurality of images. For example, one image of the plurality of images may be the image generated in response to a user input.

When the electronic apparatus 100 generates a message by composing a video image and a still image, the electronic apparatus 100 may generate a natural message matched to the user's intent without synchronization. However, when the electronic apparatus 100 composes a plurality of video images having different playback speeds, the electronic apparatus 100 needs to synchronize the plurality of video images. In particular, when the electronic apparatus 100 composes the video image generated in response to a user input (e.g., a drawing input) and the stored video image, there is a need for a method different from the method of composing the stored plurality of video images. The electronic apparatus 100 may provide a method of generating a message by composing a video image with the drawing input and the animated image object.

Figure 2:
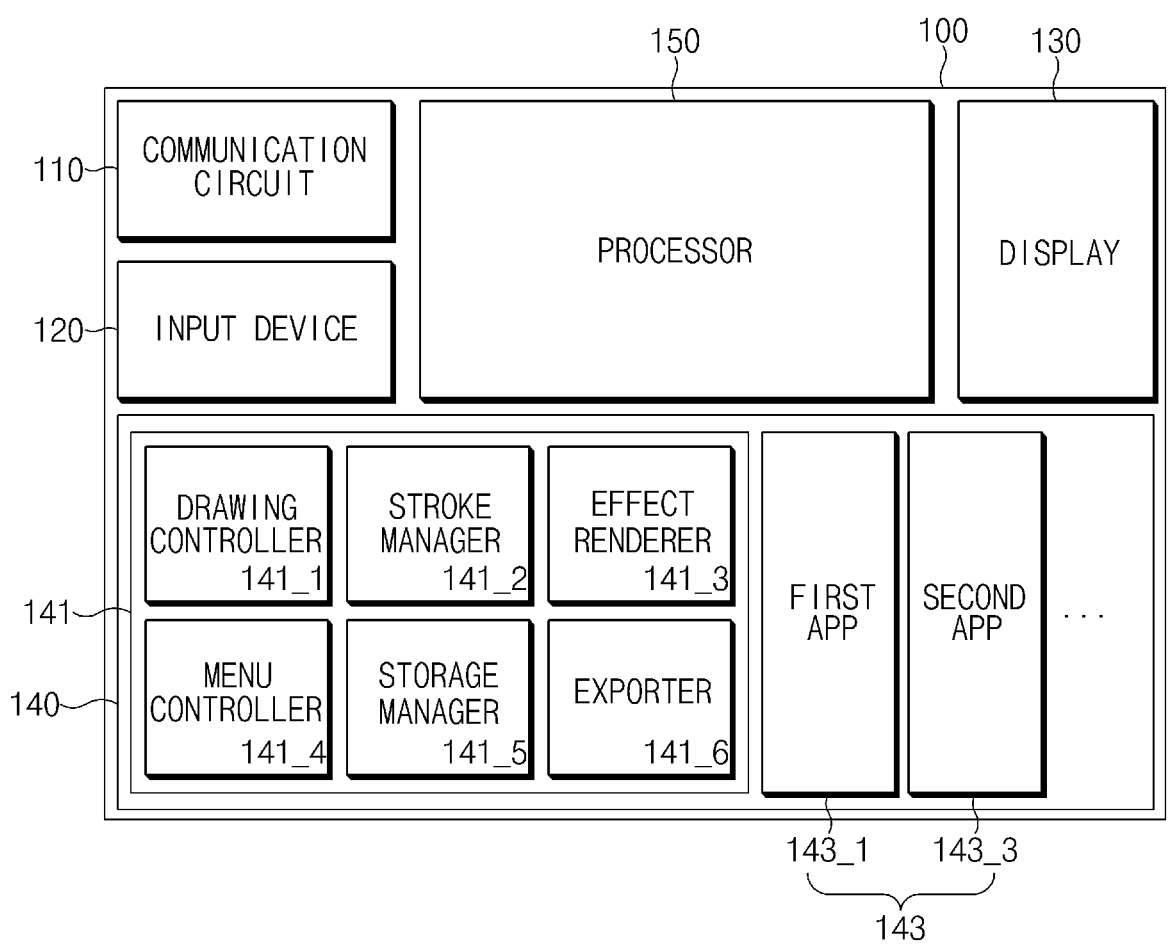
FIG. 2 is a block diagram illustrating a configuration of an electronic apparatus, according to an embodiment.

FIG. 2 is a block diagram illustrating a configuration of an electronic apparatus, according to an embodiment.

Referring to FIG. 2, the electronic apparatus 100 includes a communication circuit 110, an input device 120, a display 130, a memory 140, and a processor 150.

The communication circuit 110 may include a wireless communication circuit connected to an external device to transmit or receive data. For example, the wireless communication circuit may support 3rd generation (3G) communication, long term evolution (LTE) communication, wireless fidelity (Wi-Fi) communication, Bluetooth communication, 5th generation/new radio (5G/NR), or next radio communication implemented in the mm Wave band (e.g., sub-6 GHz band). The communication circuit 110 may be connected to a digital pen (e.g., the digital pen 200 of FIG. 1) using the Bluetooth communication.

The input device 120 may receive a user input. For example, the input device 120 may include a panel for receiving a touch input (including a hovering input) using a part of the user's body or the digital pen 200. The input device 120 may separately include a panel for receiving a touch input using the digital pen 200. The panel may be included in the display 130.

The display 130 may output an image, such as the image included in the content and the GUI of the executed app. The display 130 may include a panel for receiving a user input. In other words, the display 130 may be a touchscreen display.

The memory 140 may store a framework 141, such as a program for performing a function capable of being used in common for the specific function performed through a plurality of apps. The framework 141 may include a drawing controller 141_1, a stroke manager 141_2, an effect renderer 141_3, a menu controller 141_4, a storage manager 141_5, and an exporter 141_6 to compose the animated image object and a video image by a drawing input. The components will be described with respect to the operation of the processor 150.

The memory 140 may store at least one app 143. The memory 140 includes a first app 143_1 and a second app 143_3. The at least one app 143 may be a program for performing a specific function and/or may include a camera app for controlling the camera function, a media app for controlling media content, a gallery app for displaying an image on the display 130.

The processor 150 may control general operations of the electronic apparatus 100, and particular operations when instructions stored in the memory 140 are executed.

The processor 150 may be connected to an external device via the communication circuit 110 to transmit a message. Furthermore, the processor 150 may be connected to the digital pen 200 via the communication circuit 110 to receive a user input via a button (e.g., the button 210 of FIG. 1).

The processor 150 may receive a user input via the input device 120. For example, the processor 150 may receive a touch input using a part of the user's body or the digital pen 200, via the touch panel included in the display 130. The processor 150 may receive a selection input, a drag input, or a drawing input using a touch input, via the input device 120.

The processor 150 may display the specified image on the display 130. For example, the processor 150 may display the GUI of the executed message app on the display 130. The processor 150 may provide a user interface (UI) for entering a message via the GUI displayed on the display 130 and may display the transmitted or received message in the GUI. The processor 150 may provide the user with a UI for generating an animated message including the composed animated image object.

The processor 150 may generate a message obtained by composing the video image by using a drawing input and the animated image object. The video image may include a plurality of image frames sequentially illustrating drawing inputs. Each of the plurality of image frames may include an image input by a drawing input at a plurality of specified time points. When the video image is played, the drawing input may be displayed sequentially (i.e., chronologically). The processor 150 may perform a function for generating the animated message by executing the components 141_1 to 141_6 included in the framework 141. Hereinafter, the operation of the processor 150 that performs the specified function by executing the components 141_1 to 141_6 of the framework 141 may be described as operations of the components 141_1 to 141_6 of the framework 141.

The drawing controller 141_1 may control the whole UI of an app that receives the drawing input and then generates a message. In other words, the drawing controller 141_1 may be an upper class that controls the UI class. The drawing controller 141_1 may display the UI for generating a message on the display 130, by receiving a drawing input. The drawing controller 141_1 may display the UI for displaying the transmitted or received message, on the display 130 together with the UI for generating the message.

The stroke manager 141_2 may manage the received stroke information as a class for managing the received stroke. For example, the stroke manager 141_2 may manage the received plurality of strokes in a list format. The plurality of strokes included in a list may be defined as at least one drawing event (i.e., DrawingEvent). For example, the one drawing event may correspond to a single drawing input. The one drawing input may include a plurality of strokes.

The effect renderer 141_3 may control the surface view (i.e., SurfaceView) to display the drawing object by the received drawing input, on a drawing window. In other words, the effect renderer 141_3 may be a class that directly controls the drawing window in which the drawing object is displayed. The effect renderer 141_3 may sequentially display the drawing object by using the drawing input, on the drawing window. The drawing window may be a region included in the UI for creating a message. As such, the electronic apparatus 100 may provide a user with a user experience (UE) as if an object is drawn by the drawing input. The effect renderer 141_3 may apply a plurality of effects to an object by the drawing input.

The menu controller 141_4 may control the menu associated with the drawing input as a class that controls a menu. The menu may be displayed outside the drawing window (e.g., an upper end or a lower end) included in the UI.

The storage manager 141_5 may manage the message written in the message app as a class for storing the written message. The storage manager 141_5 may display the progress amount on the UI for entering the message when the animated image object for composing the video image by the drawing input is played in the drawing window. The progress amount may be displayed in the form of a progress bar. The storage manager 141_5 may play an animated image object in the drawing window by changing image quality or playback speed (e.g., playback time). The data size of the created message may be determined depending on the set image quality and the playback speed.

The exporter 141_6 may generate a message by composing a video image (or animation) by using a drawing input and an animated image object. In other words, the exporter 141_6 may be a class for creating a message. The exporter 141_6 may compose the first animation of a first animated image object and the second animation of a second animated image object to generate a third animated image object. As such, the exporter 141_6 may generate the animated message including the third animated image object. Each of the first animated image object, the second animated image object and the third animated image object may be, for example, a graphics interchange format (GIF) or a Moving Picture Experts Group (MPEG)-4 Part 14 (MP4) file format.

The processor 150 may compose the first animated image object, which is stored in the memory 140 or is downloadable from an external device, and the second animated image object by using the drawing input. For example, the first animated image object may include the animation (e.g., motion) of an image object (e.g., avatar), and the second animated image object may include an animation (or a video image) that sequentially displays drawing inputs.

The processor 150 may receive a user input to select the first animated image object, via a display (or the touchscreen display 130), and may play the first animation of the selected first animated image object, on the display 130.

The processor 150 may receive a drawing input overlapping with the first animated image object, via the display 130 on which the first animation is played, generate sequential data of the received drawing input, and convert the generated data into the second animated image object including a plurality of image frames.

Each of the first animation of the first animated image object and the second animation of the second animated image object may include a plurality of image frames, and at least one of the number of image frames and playback time may be different from each other. In other words, the first animation and the second animation may have different playback speeds. Further, the playback time of the first animated image object may be shorter than the playback time of the second animated image object. As such, when composing a video image (or animation) by using the drawing input with an animated image object, the processor 150 (e.g., the exporter 141_6) may need to synchronize the first animation of the animated image object with the second animation by using the drawing input.

The processor 150 may synchronize the first animation of the first animated image object with the second animation of the second animated image object by using the drawing input, based on the time at which the drawing input is entered. The processor 150 may synchronize the first animation with the second animation by matching a plurality of frames of the second animated object, using the drawing input, to the plurality of frames, such that the first animated image object is repeated in each of the plurality of frames.

The processor 150 may synchronize the first animation with the second animation by using the drawing input, based on the playback time of the first animation of the animated image object. The processor 150 may synchronize the first animation with the second animation by matching a plurality of frames of the second animated object converted from the drawing input to the plurality of frames of the first animated image object.

The processor 150 (e.g., the exporter 141_6) may generate the third animated image object by composing the synchronized first animation and the second animation. As such, the processor 150 may generate an animated message including the generated third animated image object.

The electronic apparatus 100 may synthesize the animation by using drawing inputs, which can have different playback speeds, with an animated image object.

Figure 3:
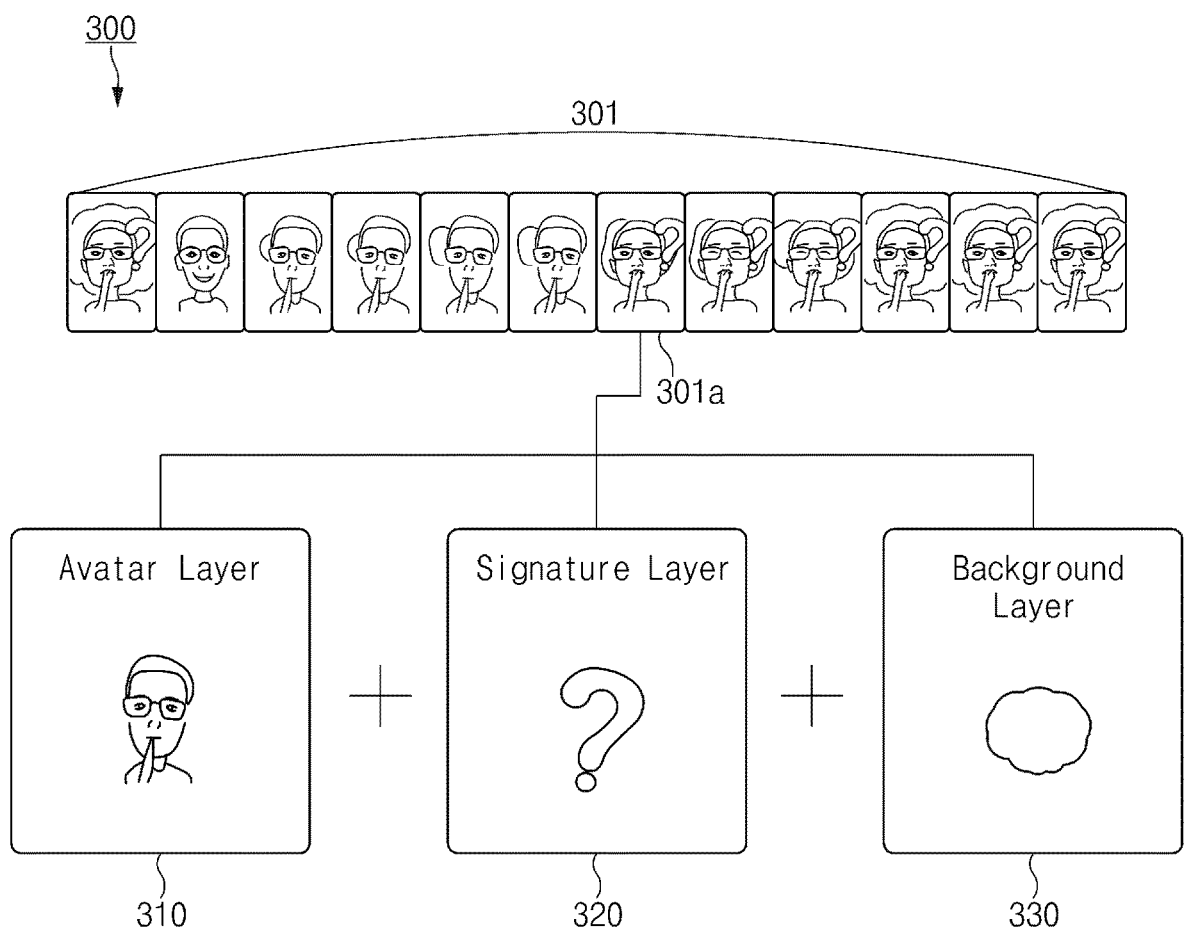
FIG. 3 illustrates a configuration of an animated image object, according to an embodiment.

FIG. 3 illustrates a configuration of an animated image object, according to an embodiment.

Referring to FIG. 3, an animated image object 300 includes a plurality of image frames 301.

Each of the plurality of image frames 301 may include an image object of a specific state. The plurality of image frames 301 may include sequential motions of an image object.

One image frame 301a may include an avatar layer 310, a signature layer 320, and a background layer 330. The avatar layer 310 may include an avatar of a specified state. For example, the avatar may be the personalized avatar of a user. The face, body, clothing, or accessories of the avatar may be changed depending on the user. The signature layer 320 may include an emoticon. For example, the emoticon may be an emoticon for expressing a condition (e.g., an emotion according to the state of the user). The background layer 330 may include the background of an avatar and an emoticon. For example, a specified effect (e.g., an image effect or a sound effect) may be applied to the background.

When playing the animated image object 300, the electronic apparatus 100 may express the motion of an image object to which an emoticon and a background screen are added.

Figure 4:
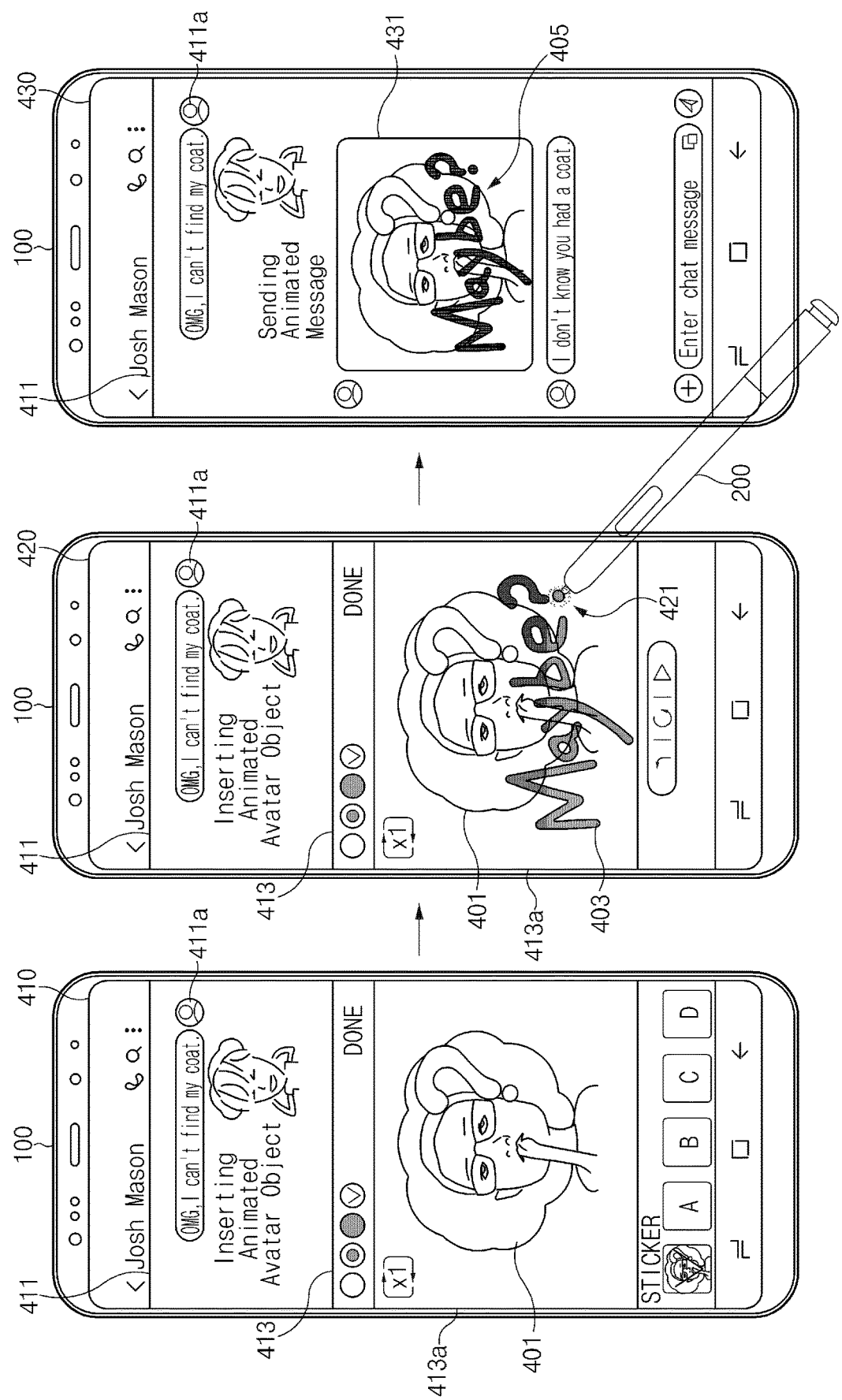
FIG. 4 illustrates a graphical use interface (GUI) for transmitting an animated message in an electronic apparatus, according to an embodiment.

FIG. 4 illustrates a GUI for transmitting an animated message in an electronic apparatus, according to an embodiment.

Referring to FIG. 4, the electronic apparatus 100 may execute a message app to generate an animated message by a drawing input.

In screen 410, the electronic apparatus 100 may execute a message app and then may display the GUI of the executed message app on a display (e.g., the display 130 of FIG. 2). For example, the electronic apparatus 100 may display a GUI of a message app including a first UI 411 for displaying the transmitted or received message and a second UI 413 for generating an animated image object, on the display 130. The electronic apparatus 100 may display a received message 411a on the first UI 411. The electronic apparatus 100 may display a first animated image object 401 for generating the animated message, on the second UI 413. The first animated image object 401 may be played on a drawing window 413a of the second UI 413. The first animated image object 401 may be played in the whole region of the drawing window 413a. The size of the first animated image object 401 may be changed, and the first animated image object 401 may be played in the partial region of the drawing window 413a. As such, it is possible to increase the region (i.e., the size of an area), into which a drawing input is capable of being entered, with respect to the first animated image object 401. The electronic apparatus 100 may repeatedly play the first animated image object 401 in the drawing window 413a at a specified cycle "T" (i.e., where "T" represents a unit of time such as a period).

In screen 420, the electronic apparatus 100 may receive a drawing input 421 via the drawing window 413a of the second UI 413. For example, the electronic apparatus 100 may receive the drawing input 421 via the drawing window 413a in which the first animated image object 401 is played. The drawing input 421 may be input using the digital pen 200. The electronic apparatus 100 may display a second animated image object 403 by using the drawing input 421 on the first animated image object 401 played via the drawing window 413a. The electronic apparatus 100 may sequentially display the second animated image object 403 by using the drawing input 421.

The electronic apparatus 100 may compose the second animated image object 403 displayed by the drawing input 421 with the first animated image object 401 played via the drawing window 413a. The electronic apparatus 100 may synchronize the first animated image object 401 with the second animated image object 403 based on an input time and a point in time when the drawing input 421 is entered. The electronic apparatus 100 may determine a location to be composed with the first animated image object 401, based on the location at which the second animated image object 403 is entered in the drawing window 413a. The electronic apparatus 100 may compose the synchronized first animated image object 401 with the synchronized second animated image object 403 at the entered location to generate a third animated image object 405.

In screen 430, the electronic apparatus 100 may transmit an animated message 431 including the third animated image object 405, to an external electronic apparatus. The electronic apparatus 100 may display the animated message 431 including the third animated image object 405 on the second UI 413.

Figure 5:
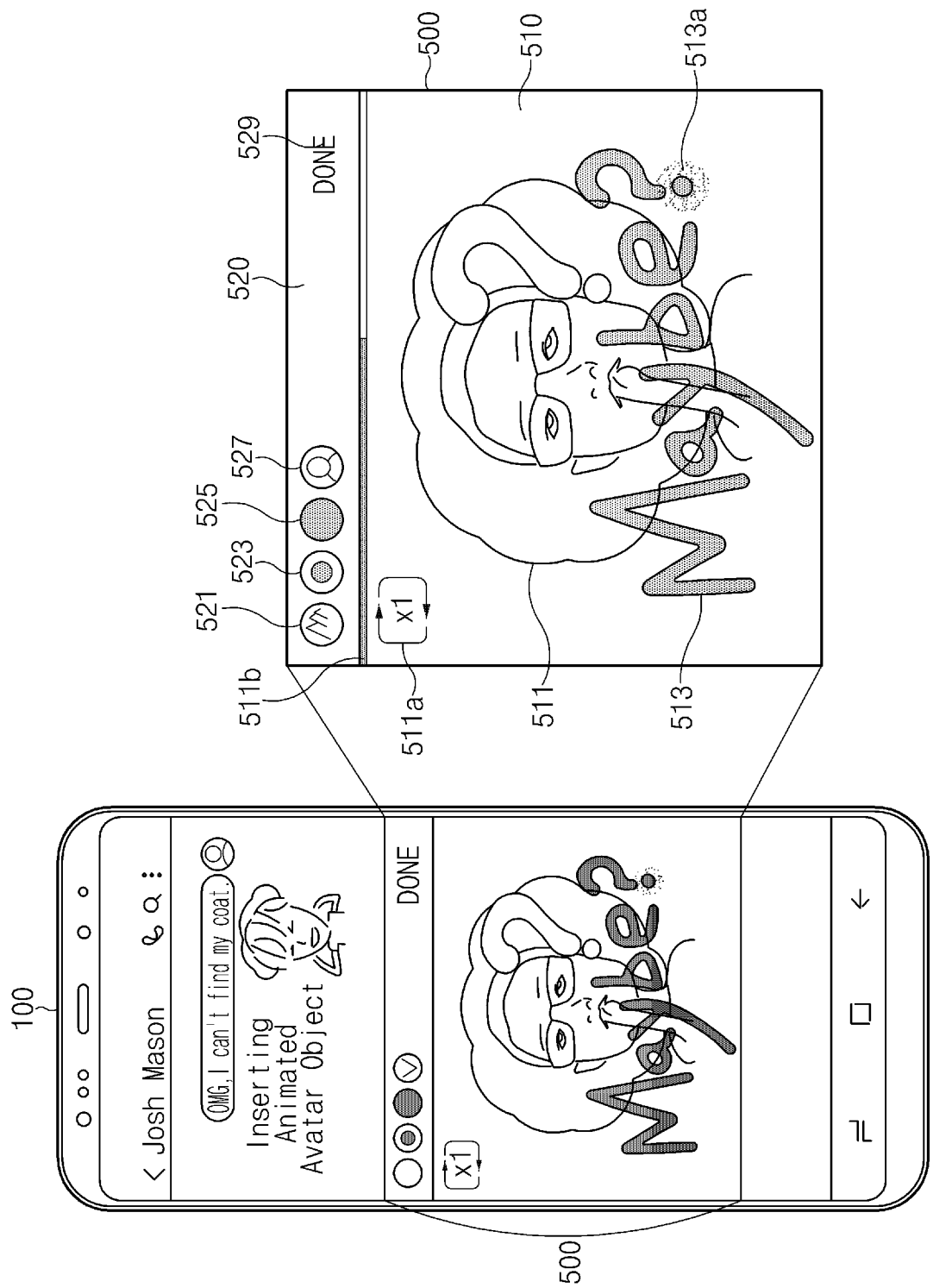
FIG. 5 illustrates a GUI for receiving a drawing input in an electronic apparatus, according to an embodiment.

FIG. 5 illustrates a GUI for receiving a drawing input in an electronic apparatus, according to an embodiment.

Referring to FIG. 5, the electronic apparatus 100 provides a UI 500 for composing a plurality of animated image objects via a message app.

The electronic apparatus 100 may provide the UI 500 including a drawing window 510 for receiving a drawing input and a drawing tool panel 520.

The electronic apparatus 100 may play a first animated image object 511 to be composed in the drawing window 510. In other words, the electronic apparatus 100 may sequentially display a plurality of image frames included in the first animated image object 511 to be composed in the drawing window 510. The electronic apparatus 100 may display an indicator 511a indicating the playback speed of the first animated image object 511 in the drawing window 510. The user may adjust the playback speed of the first animated image object 511 via the indicator 511a indicating the playback speed. The electronic apparatus 100 may display a progress bar 511b indicating the progress amount of the first animated image object 511, in the drawing window 510.

The electronic apparatus 100 may sequentially display the image object 513 by using the drawing input, in the drawing window 510. The electronic apparatus 100 may display an indicator 513a indicating the current drawing point. The specified effect (e.g., a water drop effect) may be applied to the indicator 513a.

The electronic apparatus 100 may display a plurality of tools for setting the drawing input, on the drawing tool panel 520. For example, the electronic apparatus 100 may display a plurality of tools for setting a drawing input using a digital pen 200, on the drawing tool panel 520. The plurality of tools may include a tool 521 for selecting a pen type, a tool 523 for selecting the thickness of a stroke, a tool 525 for selecting the color of a pen, and a tool 527 for selecting an animated image object for composing. The electronic apparatus 100 may display a button 529 for generating an animated message, on the drawing tool panel 520. The electronic apparatus 100 may receive a user input (e.g., a touch input) for generating an animated message via the button 529. The user may complete the drawing input by selecting the button 529.

The user may generate an animated message via the UI 500 for composing a plurality of animated image objects.

Figure 6:
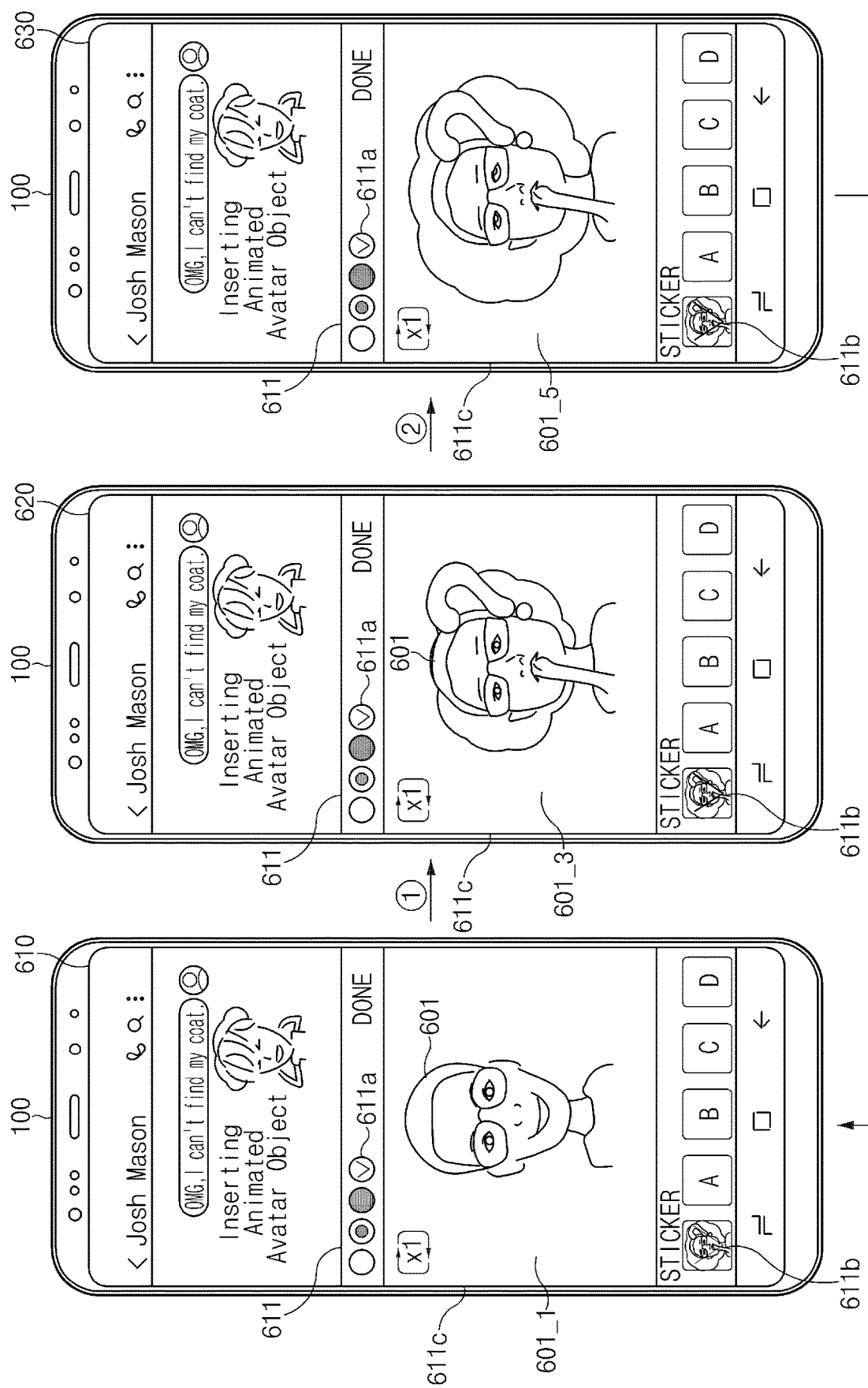
FIG. 6 illustrates an operation in which an electronic apparatus plays an animated image object for composing, according to an embodiment.

FIG. 6 illustrates an operation in which an electronic apparatus plays an animated image object for composing, according to an embodiment.

Referring to FIG. 6, the electronic apparatus 100 may repeatedly play an animated image object necessary for composing.

In screen 610, the electronic apparatus 100 may receive a user input for activating an animated image object selection region, via a tool 611a (e.g., a tool 527 of FIG. 5) for selecting an animated image object. The electronic apparatus 100 may receive a user input (e.g., touch input) to select the animated image object 601, via an object 611b included in a UI 611 for generating an animated message. The electronic apparatus 100 may play the selected animated image object 601 in a drawing window 611c. For example, the electronic apparatus 100 may display a first image frame 601_1 of the animated image object 601 in the drawing window 611c.

In screen 620 and screen 630, the electronic apparatus 100 may continuously play the animated image object 601, in the drawing window 611c ①, ②. For example, the electronic apparatus 100 may sequentially display a second image frame 601_3 and a third image frame 601_5 of the animated image object 601, in the drawing window 611c, and the electronic apparatus 100 may play the first animated image object 601 again ③.

Accordingly, the electronic apparatus 100 may repeatedly play the first animated image object 601 at a specified cycle "T" (i.e., ①, ②, ③). The electronic apparatus 100 may receive the drawing input of the user via the drawing window 611c in which the first animated image object 601 is repeatedly played.

Figure 7A:
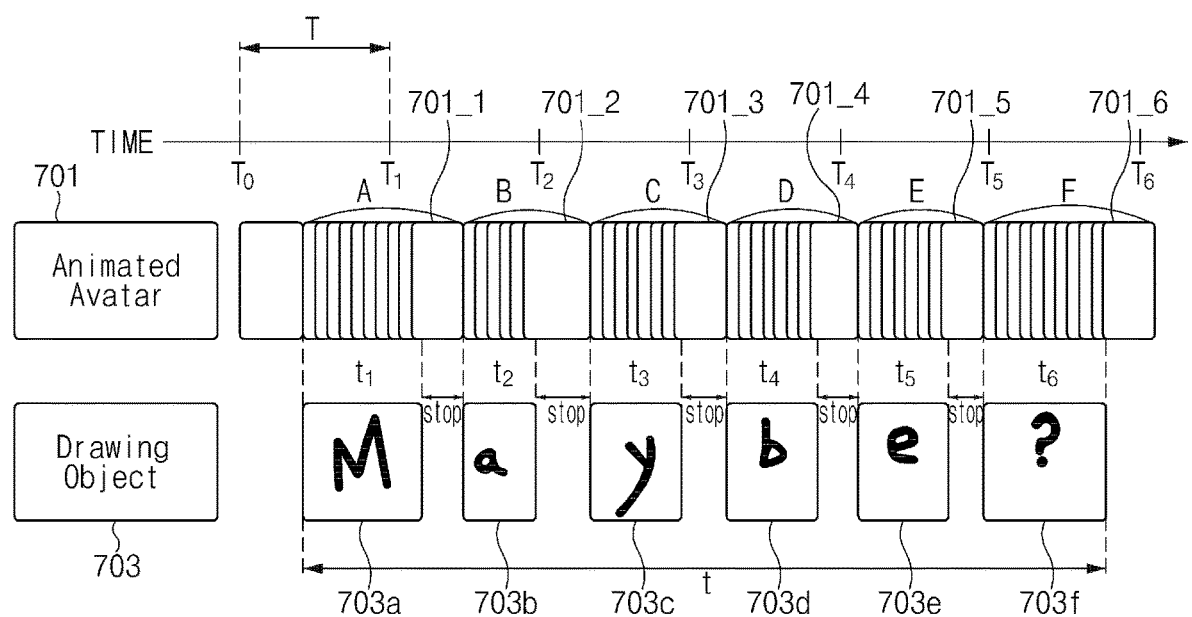
FIG. 7A illustrates a method of synchronizing a plurality of animated image objects based on a point in time when a drawing input of an electronic apparatus is entered, according to an embodiment.

FIG. 7A illustrates a method of synchronizing a plurality of animated image objects based on a point in time when a drawing input of an electronic apparatus is entered, according to an embodiment.

Referring to FIG. 7A, an electronic apparatus (e.g., the electronic apparatus 100 of FIG. 2) may synchronize a first animated image object 701 with a second animated image object 703, by matching a plurality of image frames of the second animated image object (e.g., Drawing Object) 703 by using a drawing input to a plurality of image frames which the first animated image object (e.g., Animated Avatar) 701 repeatedly played on a display (e.g., the display 130 of FIG. 2).

The electronic apparatus 100 may synchronize the first animated image object 701 with the second animated image object 703 based on a point in time when the drawing input is entered.

The electronic apparatus 100 may match the image frame of the first animated image object 701 displayed on the display 130 to an image frame including the second animated image object 703 for a drawing input entered until a point in time when the image frame is displayed.

The electronic apparatus 100 may determine whether to play the first animated image object 701, based on whether contact by a drawing input is detected on the display (or touchscreen display) 130. In other words, the electronic apparatus 100 may determine whether to play the first animated image object 701, based on whether the stroke inputs 703a, 703b, 703c, 703d, 703e, and 703f of the drawing input are received. For example, when contact by a drawing input is detected on the display 130, the electronic apparatus 100 may sequentially display a plurality of image frames included in the first animated image object 701, on the display 130. When the touch input of a touchscreen display by a drawing input is not detected, the electronic apparatus 100 may continuously display the image frame of the first animated image object 701 displayed on the display 130, corresponding to a point in time when the contact is not detected.

The electronic apparatus 100 may repeatedly play the first animated image object 701 at the specified cycle "T", during the input time "t" of the drawing input. When the stroke inputs 703a, 703b, 703c, 703d, 703e, and 703f are received, the electronic apparatus 100 may play the first animated image object 701. The electronic apparatus 100 may continuously display the image frame 701_1, 701_2, 701_3, 7014, 701_5, and 701_6 displayed on the display 130 at a point in time when the stroke inputs 703a, 703b, 703c, 703d, 703e, and 703f are interrupted (i.e., at a time in between strokes being input), on the display 130.

Accordingly, the electronic apparatus 100 may match the second animated image object 703 by the stroke inputs 703a (e.g., M), 703b (e.g., a), 703c (e.g., y), 703d (e.g., b), 703e (e.g., e), and 703*f* (e.g., ?) to a plurality of image frames A, B, C, D, E, and F of the first animated image object 701 displayed on the display 130 during input times $t_1$, $t_2$, $t_3$, $t_4$, $t_5$, and $t_6$.

The electronic apparatus 100 may synchronize the first animated image object 701 with the second animated image object 703 by using the drawing input, based on the matched state. The electronic apparatus 100 may compose the synchronized first animated image object 701 with the synchronized second animated image object 703 to generate a third animated image object.

When the generated third animated image object is played, the drawing object 703 by the drawing input may be smoothly and naturally played on the first animated image object 701 repeatedly played. Further, the electronic apparatus 100 may interrupt the playback of the first animated image object 701 at a point in time when a drawing input is not received, thereby saving the power required for playback.

Figure 7B:
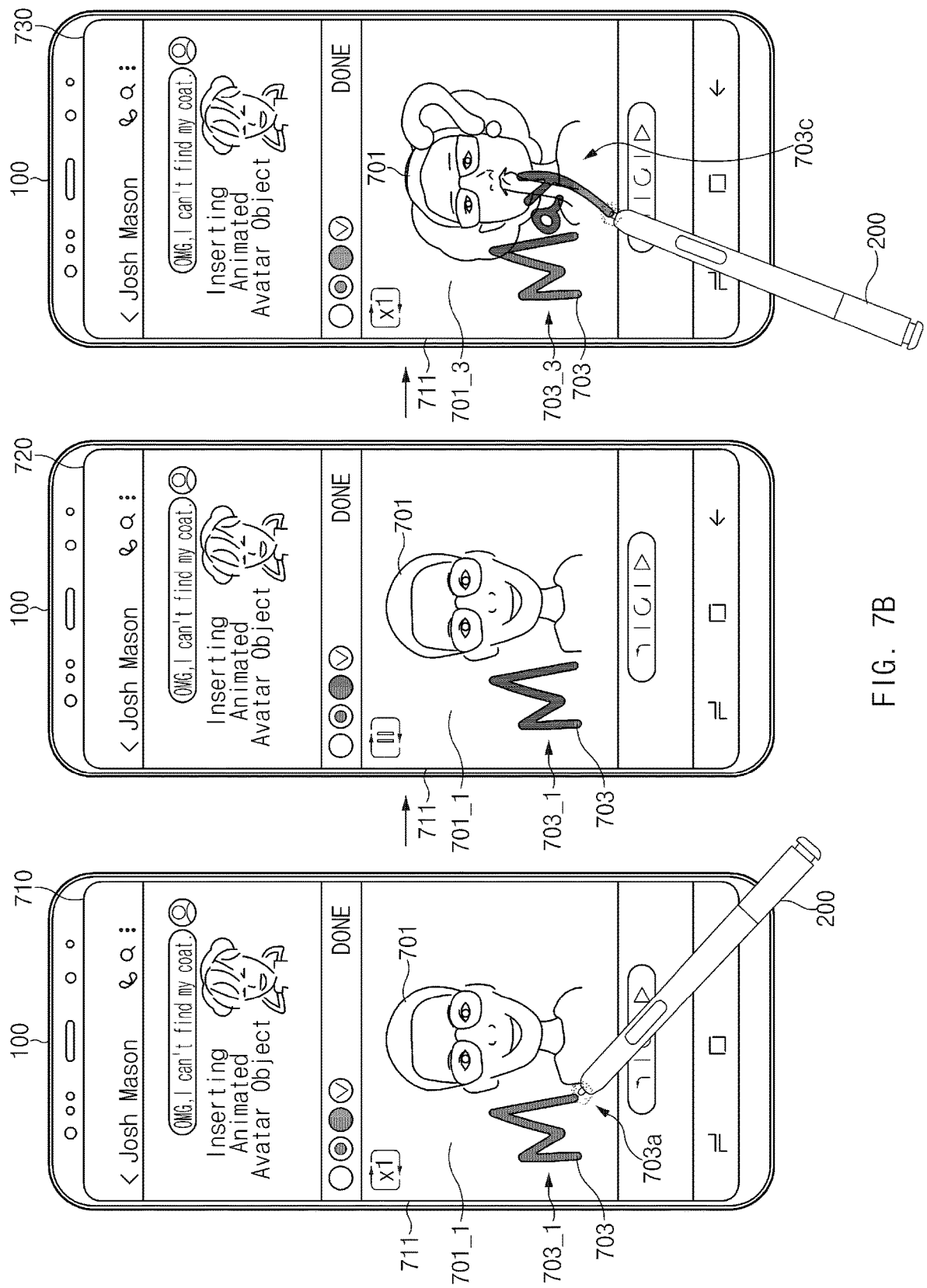
FIG. 7B illustrates a screen in which an animated message is generated based on a point in time when a drawing input of an electronic apparatus is entered, according to an embodiment.

FIG. 7B illustrates a screen in which an animated message is generated based on a point in time when a drawing input of an electronic apparatus is entered, according to an embodiment.

In screen 710, the electronic apparatus 100 may receive a first stroke input (e.g., M) 703*a* of a drawing input. When the electronic apparatus 100 starts receiving the first stroke input 703*a*, the electronic apparatus 100 may play the first animated image object 701. When the reception of the first stroke input 703*a* is terminated, the electronic apparatus 100 may interrupt the playback of the first animated image object 701 and display a first image frame 701_1 of the first animated image object 701 and a first image frame (e.g., M) 703_1 including the second animated image object 703 by using the first stroke input 703 a, in a drawing window 711.

In screen 720, the electronic apparatus 100 may interrupt the reception of the drawing input. When the reception of the drawing input is interrupted, the electronic apparatus 100 may interrupt the playback of the first animated image object 701. The electronic apparatus 100 may continuously display the first image frame 701_1 of the first animated image object 701 displayed when the first stroke input 703 a is terminated, in the drawing window 711.

In screen 730, the electronic apparatus 100 may receive a third stroke input (e.g., y) 703*c* by a drawing input. When the electronic apparatus 100 starts receiving the third stroke input 703*c*, the electronic apparatus 100 may play the first animated image object 701 again. When the third stroke input 703*c* is terminated, the electronic apparatus 100 may display a second image frame 701_3 of the first animated image object 701 and a third image frame (e.g., May) 703_3 of the second animated image object 703, in the drawing window 711.

Figure 8A:
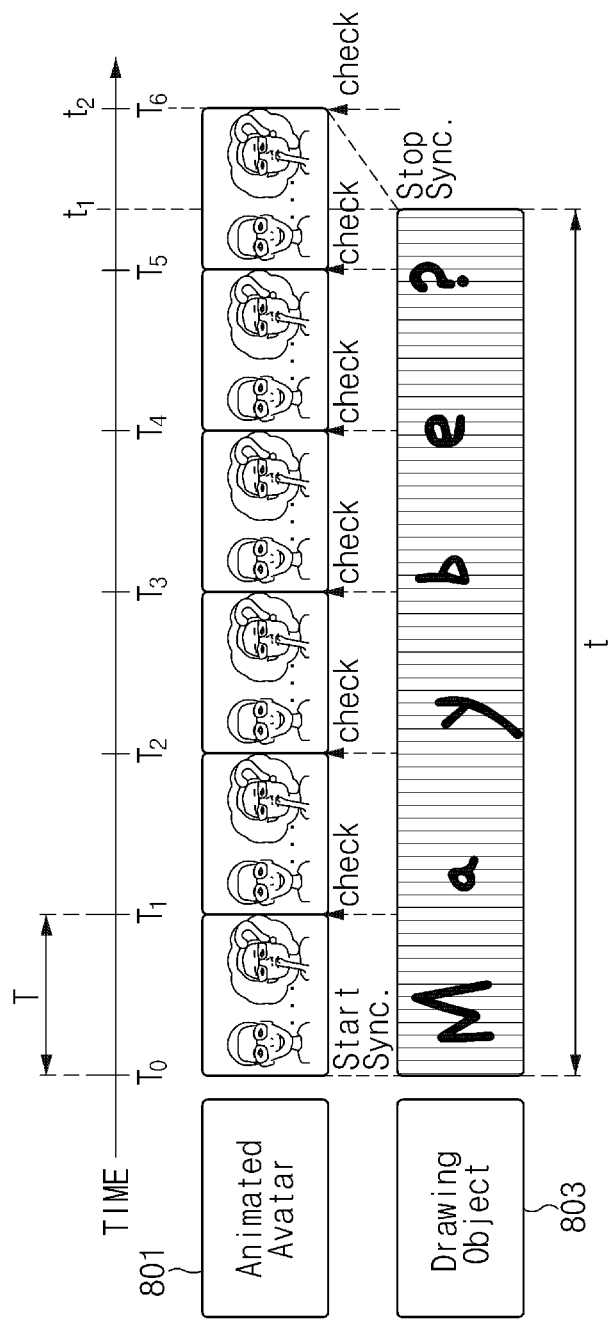
FIG. 8A illustrates a method of synchronizing a plurality of animated image objects based on a point in time when a drawing input of an electronic apparatus is entered, according to an embodiment.
Figure 8B:
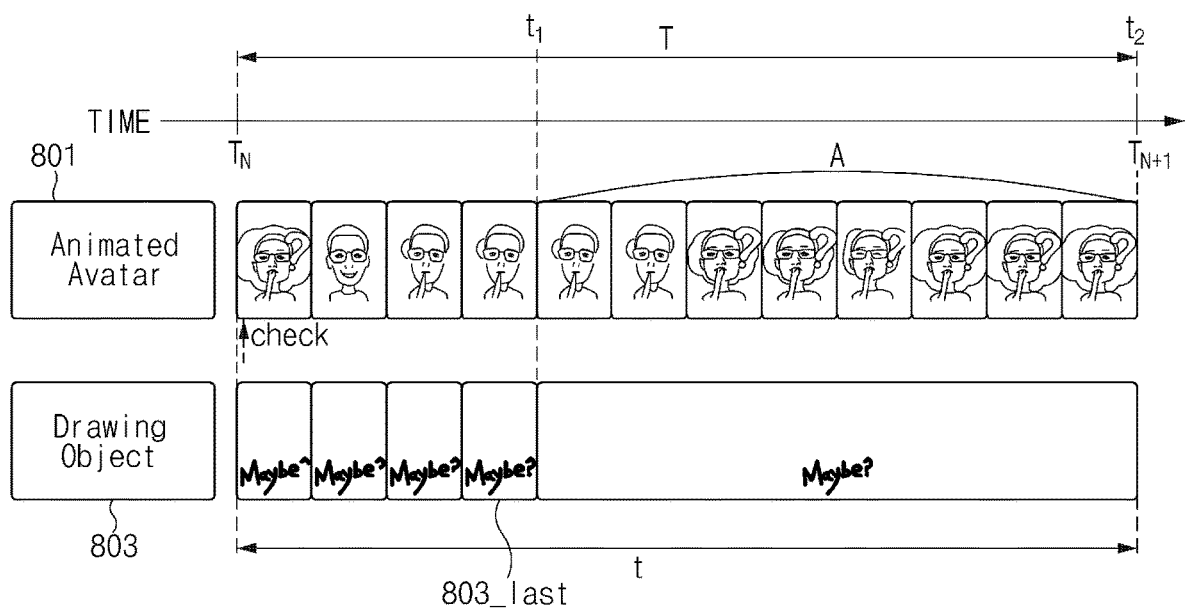
FIG. 8B illustrates a method of synchronizing a plurality of animated image objects based on a point in time when a drawing input of an electronic apparatus is entered, according to an embodiment.

FIGS. 8A and 8B illustrate a method of synchronizing a plurality of animated image objects based on a point in time when a drawing input of an electronic apparatus is entered, according to an embodiment.

Referring to FIG. 8A, an electronic apparatus (e.g., the electronic apparatus 100 of FIG. 2) may synchronize a first animated image object 801 with a second animated image object 803, by matching a plurality of image frames of a second animated image object 803 using a drawing input to a plurality of image frames which the first animated image object 801 repeatedly played on the display 130.

As in FIG. 7A, the electronic apparatus 100 may synchronize the first animated image object 801 with the second animated image object 803 based on a point in time when the drawing input is entered.

As in FIG. 7A, the electronic apparatus 100 may match the image frame of the first animated image object 801 displayed on a display (e.g., the display 130 of FIG. 2) to an image frame including the second animated image object 803 for a drawing input entered until a point in time when the image frame is displayed.

The electronic apparatus 100 may repeatedly play the first animated image object 801 at the specified cycle "T", during the input time "t" of the drawing input. The electronic apparatus 100 may repeatedly play the first animated image object 801, regardless of whether the stroke input included in the drawing input is received.

The electronic apparatus 100 may determine whether to repeatedly play the first animated image object 801 at a specified time point. For example, the electronic apparatus 100 may determine whether to repeatedly play the first animated image object 801 at each time point $T_1$, $T_2$, $T_3$, $T_4$, $T_5$, or $T_6$ at which the first animated image object 801 is played repeatedly. In addition, the electronic apparatus 100 may determine whether to repeatedly play the first animated image object 801, at the start time point and the end time point of at least one stroke input of the drawing input.

The electronic apparatus 100 may determine whether to repeatedly play the first animated image object 801, by determining whether the drawing input is received. When contact by a drawing input is detected via a touchscreen display (e.g., the display 130 of FIG. 2), the electronic apparatus 100 may determine that the first animated image object 801 is played again. In addition, when the electronic apparatus 100 does not receive a user input to complete a drawing input, the electronic apparatus 100 may determine that the first animated image object 801 is played again.

Because the playback speed (e.g., 12 frames per second (fps)) of the first animated image object 801 and the playback speed (e.g., 20 fps) of the second animated image object 803 are different from each other, a time point $t_2$ at which one cycle of the first animated image object 801 ends and a time point $t_1$ at which the second animated image object 803 ends may not coincide with each other. Consequently, it may be necessary to synchronize a plurality of image frames of the first animated image object 801 displayed after the time point $t_1$, may be synchronized when the second animated image object 803 ends.

Referring to FIG. 8B, the electronic apparatus 100 may match the last image frame 803_last to at least one frame (or the remaining image frame) A of the first animated image object displayed on the display 130 after the time point corresponding to the last image frame 803_last of the second animated image object 803 using the drawing input.

The number of remaining image frames A corresponding to the last image frame 803_last of the second animated image object 803 by the drawing input may be calculated based on Equation 1.

$$A = N \times F_1 - T_{draw} \times S_{draw}$$

$$N > (T_{draw} \times S\ draw)/F_1 \qquad \text{Equation 1:}$$

In Equation 1, $F_1$ may denote the number of image frames of the first animated image object 801; $T_{draw}$ and $S_{draw}$ may denote the input time (or the playback time of the second animated image object 803) of the drawing input and the playback speed of the second animated image object 803, respectively. "N" may be an integer and "A" may be less than the number of image objects of the first animated image object 801 ($0 \leq A < F1$).

Because "N" is greater than 23.333 when the input time $T_{draw}$ of the drawing input is 14 sec, the playback speed $S_{draw}$ of the second animated image object 803 is 20 fps, and the number of image frames $F_1$ of the first animated image object 801 is 12 frames, "N" may be 24 and "A" may be 8 (A=(24*12)−(14*20)=8). The remaining eight image frames of the first animated image object 801 may correspond to the last image frame 803_last of the second animated image object 803.

The electronic apparatus 100 may synchronize the first animated image object 801 with the second animated image object 803 by the drawing input, based on the matched state. The electronic apparatus 100 may compose the synchronized first animated image object 801 with the synchronized second animated image object 803 to generate a third animated image object.

When the generated third animated image object is played, the second animated image object (e.g., a drawing object) 803 by the drawing input may be smoothly and naturally repeatedly played on the first animated image object 801.

Figure 9A:
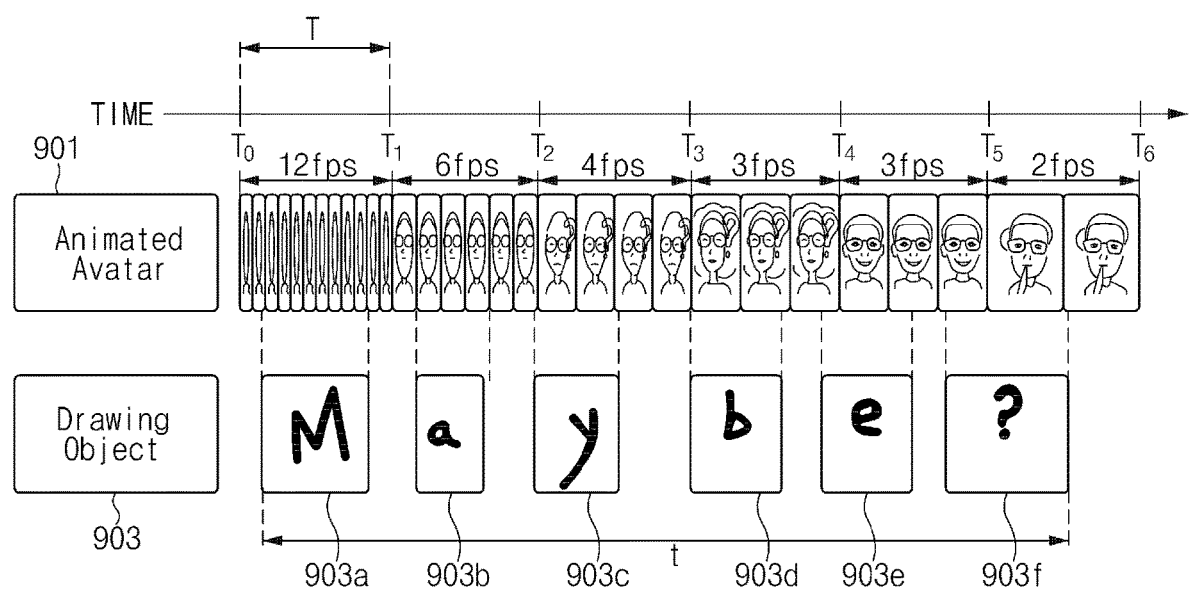
FIG. 9A illustrates a method of synchronizing a plurality of animated image objects based on a playback time of one animated image object of an electronic apparatus, according to an embodiment.
Figure 9B:
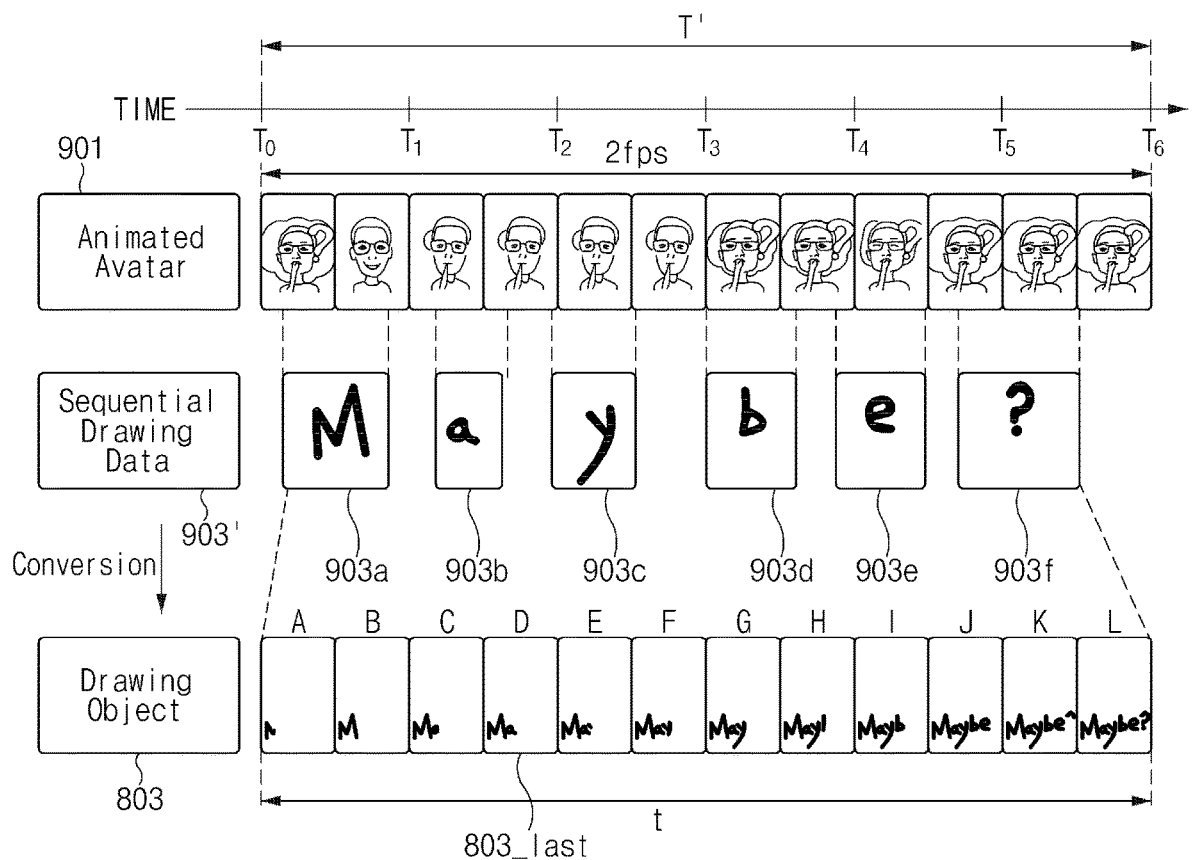
FIG. 9B illustrates a method of synchronizing a plurality of animated image objects based on a playback time of one animated image object of an electronic apparatus, according to an embodiment.
Figure 9C:
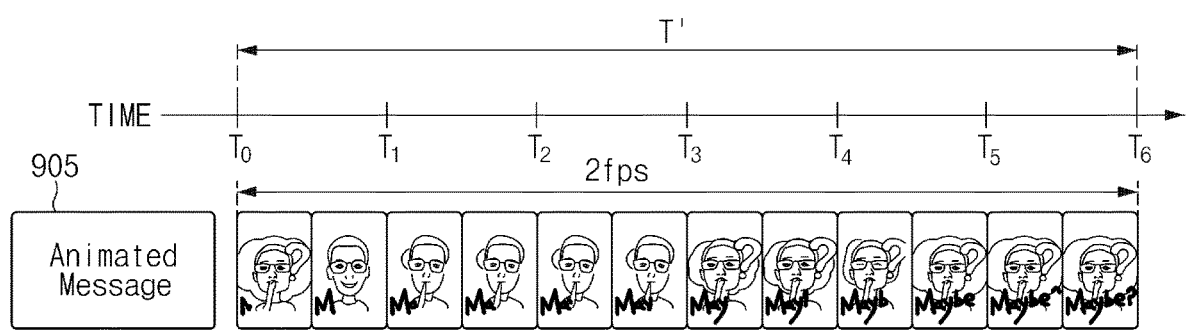
FIG. 9C illustrates a method of synchronizing a plurality of animated image objects based on a playback time of one animated image object of an electronic apparatus, according to an embodiment.

FIGS. 9A to 9C illustrate a method of synchronizing a plurality of animated image objects based on a playback time of one animated image object of an electronic apparatus, according to an embodiment.

Referring to FIG. 9A, the electronic apparatus 100 may synchronize a first animated image object 901 with a second animated image object 903, by matching a plurality of image frames of the second animated image object 903 using a drawing input to a plurality of image frames of the first animated image object 901.

The electronic apparatus 100 may synchronize the first animated image object 901 with the second animated image object 903 based on a playback time of the first animated image object 901.

When obtaining the second animated image object 903, the electronic apparatus 100 may generate a plurality of image frames of the second animated image object 903, by dividing data of the received drawing input based on the determined playback time "t" of the first animated image object 901.

For the purpose of generating a plurality of image frames of the second animated image object 903 respectively corresponding to a plurality of image frames of the first animated image object 901, the electronic apparatus 100 may change the playback attribute (e.g., playback speed) of the first animated image object 901.

When the electronic apparatus 100 receives a drawing input to determine the playback speed of the first animated image object 901, the electronic apparatus 100 may reduce the playback speed of the first animated image object 901, which is being repeatedly played. The electronic apparatus 100 may reduce the playback speed at time points $T_1$, $T_2$, $T_3$, $T_4$, $T_5$, and $T_6$ at each of which the first animated image object 901 is played repeatedly. The electronic apparatus 100 may reduce the playback speed of the first animated image object 901 based on whether the stroke inputs 903a, 903b, 903c, 903d, 903e, and 903f of the drawing input are received.

The electronic apparatus 100 may determine the playback speed $S_{avatar}$ of the first animated image object 901 based on Equation 2.

$$S_{avatar} = F_{avatar}/(C_{avatar} * T_{avatar})$$

$$T_{draw} > T_{avatar} \quad \text{Equation 2:}$$

In Equation (2), $F_{avatar}$ may denote the number of image frames of the first animated image object 901; $C_{avatar}$ and $T_{avatar}$ may denote the number of times that the first animated image object 901 is repeatedly played and the original playback time of the first animated image object 901, respectively.

When the original playback time $T_{avatar}$ of the first animated image object 901 is 1 second and the number of image frames $F_{avatar}$ of the first animated image object 901 is 12, the playback speed $S_{avatar}$ of the second cycle may be 6 fps (12/(2*1)=6). The playback speed $S_{avatar}$ of the third cycle may be 4 fps (12/(3*1)=4).

When there is a stroke input at a time point $T_1$, $T_2$, $T_3$, $T_4$, $T_5$, or $T_6$ at which the playback of the first animated image object 901 is terminated, the electronic apparatus 100 may maintain the playback speed of the first animated image object 801 being played without being terminated. For example, when the existing stroke input is received at the time point $T_1$, $T_2$, $T_3$, $T_4$, $T_5$, or $T_6$ at which the playback of the first animated image object 901 is terminated, or when the next stroke input is received newly, the electronic apparatus 100 may maintain the playback speed of the first animated image object 801 being played without being terminated.

When the electronic apparatus 100 plays the first animated image object 901 for a first time, the electronic apparatus 100 may receive the first stroke input 903a. The electronic apparatus 100 may play the first animated image object 901 at a first playback speed (e.g., 12 fps). The playback speed $S_{avatar}$ of the first animated image object 901 may be an integer greater than "0" ($S_{avatar} > 0$).

When the electronic apparatus 100 plays the first animated image object 901 for a second time, the electronic apparatus 100 may receive the second stroke input 903b. The electronic apparatus 100 may play the first animated image object 901 at a second playback speed (e.g., 6 fps).

When the electronic apparatus 100 plays the first animated image object 901 for a third time, the electronic apparatus 100 may receive the third stroke input 903c. The electronic apparatus 100 may play the first animated image object 901 at a third playback speed (e.g., 4 fps).

When the electronic apparatus 100 plays the first animated image object 901 for a fourth time, the electronic apparatus 100 may receive the fourth stroke input 903d. The electronic apparatus 100 may play the first animated image object 901 at a fourth playback speed (e.g., 3 fps). Before the fourth playback of the first animated image object 901 is terminated, the electronic apparatus 100 may receive the fifth stroke input 903e. When the electronic apparatus 100 plays the first animated image object 901 for a fifth time, the electronic apparatus 100 may play the first animated image object 901 at the same speed (e.g., 3 fps) of the playback as the fourth playback.

When the electronic apparatus 100 plays the first animated image object 901 for a sixth time, the electronic apparatus 100 may receive the sixth stroke input 903f. The electronic apparatus 100 may play the first animated image object 901 at a fifth playback speed (e.g., 2 fps). The fifth playback speed may be the playback speed of the first animated image object 901 being composed.

Accordingly, the electronic apparatus 100 may determine the playback speed of the first animated image object 901 for generating a plurality of image frames of the second animated image object 903 to respectively correspond to a plurality of image frames of the first animated image object 901.

Referring to FIG. 9B, the electronic apparatus 100 may generate the second animated image object 903 including a plurality of image frames A, B, C, D, E, F, G, H, I, J, K, and L, the number of which is the same as the number of image frames of the first animated image object 901.

The electronic apparatus 100 may convert sequential data 903' of the received drawing input into a plurality of image frames A, B, C, D, E, F, G, H, I, J, K, and L of the second animated image object 903. The electronic apparatus 100 may generate the plurality of image frames A, B, C, D, E, F, G, H, I, J, K, and L of the second animated image object 903, by dividing data 903' according to the sequential stroke inputs 903*a*, 903*b*, 903*c*, 903*d*, 903*e*, and 903*f* of the drawing input based on the changed playback time T' according to the playback speed of the first animated image object 901. The electronic apparatus 100 may divide the sequential data 903' of the drawing input, by dividing the changed playback time T' by as many as the number of image frames of the first animated image object 901.

The electronic apparatus 100 may match a plurality of image frames of the first animated image object 901, which are displayed depending on the changed playback time T', to the plurality of image frames A, B, C, D, E, F, G, H, I, J, K, and L of the second animated image object 903, respectively.

The electronic apparatus 100 may synchronize the first animated image object 901 with the second animated image object 903 by using the drawing input, based on the matched state.

Referring to FIG. 9C, the electronic apparatus 100 may compose the synchronized first animated image object 901 and second animated image object 903 by a drawing input.

The electronic apparatus 100 may generate a third animated image object 905 by composing a plurality of image frames of the first animated image object 901 displayed depending on the changed playback time T' with a plurality of image frames of the second animated image object 903 that are matched in FIG. 9C. The playback speed of the third animated image object 905 may be the same as the determined playback speed (e.g., 2 fps) of the first animated image object 901.

The electronic apparatus 100 may generate the animated message in which the third animated image object 905 is included.

Figure 9D:
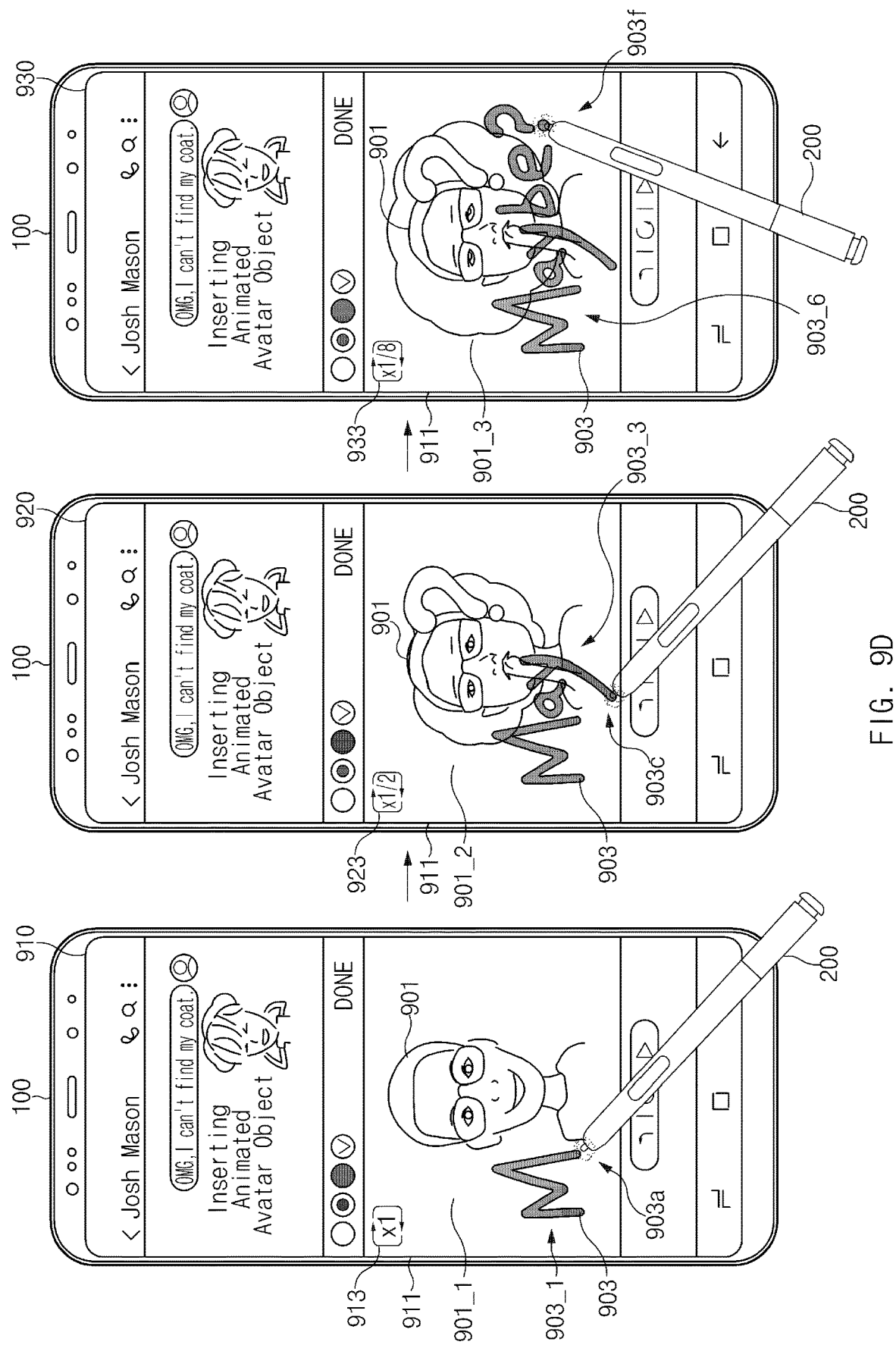
FIG. 9D illustrates a screen in which an electronic apparatus generates an animated message based on a playback time of one animated image object, according to an embodiment.

FIG. 9D is a view illustrating a screen in which an electronic apparatus generates an animated message based on a playback time of one animated image object, according to an embodiment.

Referring to FIG. 9D, in screen 910, the electronic apparatus 100 may receive a first stroke input (e.g., M) 903*a* of a drawing input. The electronic apparatus 100 may play the first animated image object 901 at a first playback speed. For example, the electronic apparatus 100 may play the first animated image object 901 at the original playback speed (e.g., 1× speed) 913. When the first stroke input 903*a* is terminated, the electronic apparatus 100 may display a first image frame 901_1 of the first animated image object 901 and a first image frame (e.g., M) 903_1 including the second animated image object 903 by the first stroke input 903*a*, in a drawing window 911.

In screen 920, the electronic apparatus 100 may receive a third stroke input (e.g., y) 903*c* of a drawing input. The electronic apparatus 100 may play the first animated image object 901 at a third playback speed. The electronic apparatus 100 may play the first animated image object 901 at the third playback speed (e.g., 1/2× speed) 923 lower than the first playback speed. When the third stroke input 903*c* is terminated, the electronic apparatus 100 may display a second image frame 901_2 of the first animated image object 901 and a third image frame (e.g., May) 903_3 including the second animated image object 903 by the third stroke input 903*c*, in the drawing window 911.

In screen 930, the electronic apparatus 100 may receive a sixth stroke input (e.g., ?) 903*f* of a drawing input. The electronic apparatus 100 may play the first animated image object 901 at a fifth playback speed. For example, the electronic apparatus 100 may play the first animated image object 901 at a fifth playback speed (e.g., 1/8× speed) 933 lower than the second playback speed. When the sixth stroke input 903*f* is terminated, the electronic apparatus 100 may display a third image frame 901_3 of the first animated image object 901 and a sixth image frame (e.g., Maybe?) 903_6 including the second animated image object 903 by the sixth stroke input 903*f*, in the drawing window 911.

When the generated third animated image object 905 is played, the second animated image object (e.g., a drawing object) 903 by using the drawing input may be smoothly and naturally played on the first animated image object 901 played during one cycle. Further, the electronic apparatus 100 may generate an animated message with a small data size, by generating the third animated image object 905 using only the plurality of image frames of one cycle T of the first animated image object 901.

Figure 10A:
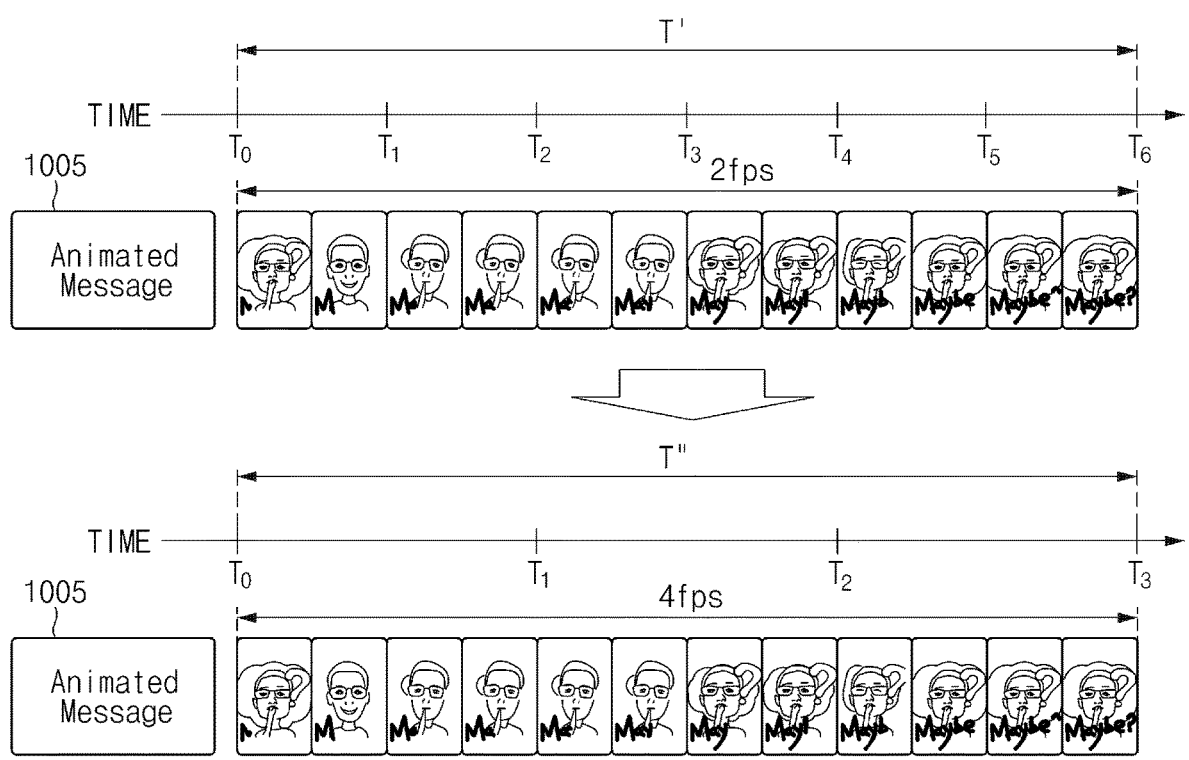
FIG. 10A illustrates a method of changing a playback speed of a generated animated image object in an electronic apparatus, according to an embodiment.

FIG. 10A illustrates a method of changing a playback speed of a generated animated image object in an electronic apparatus, according to an embodiment.

Referring to FIG. 10A, the electronic apparatus 100 may change the playback speed of the third animated message 905 generated in FIG. 9C.

An electronic apparatus (e.g., the electronic apparatus 100 of FIG. 2) may change a first playback speed (e.g., 2 fps) of a third animated image object 1005 to a second playback speed (e.g., 4 fps). In other words, the electronic apparatus 100 may change the playback time T' of the third animated image object 1005 to another playback time T". The electronic apparatus 100 may generate an animated message including the third animated image object 1005 of which the playback speed is changed.

Figure 10B:
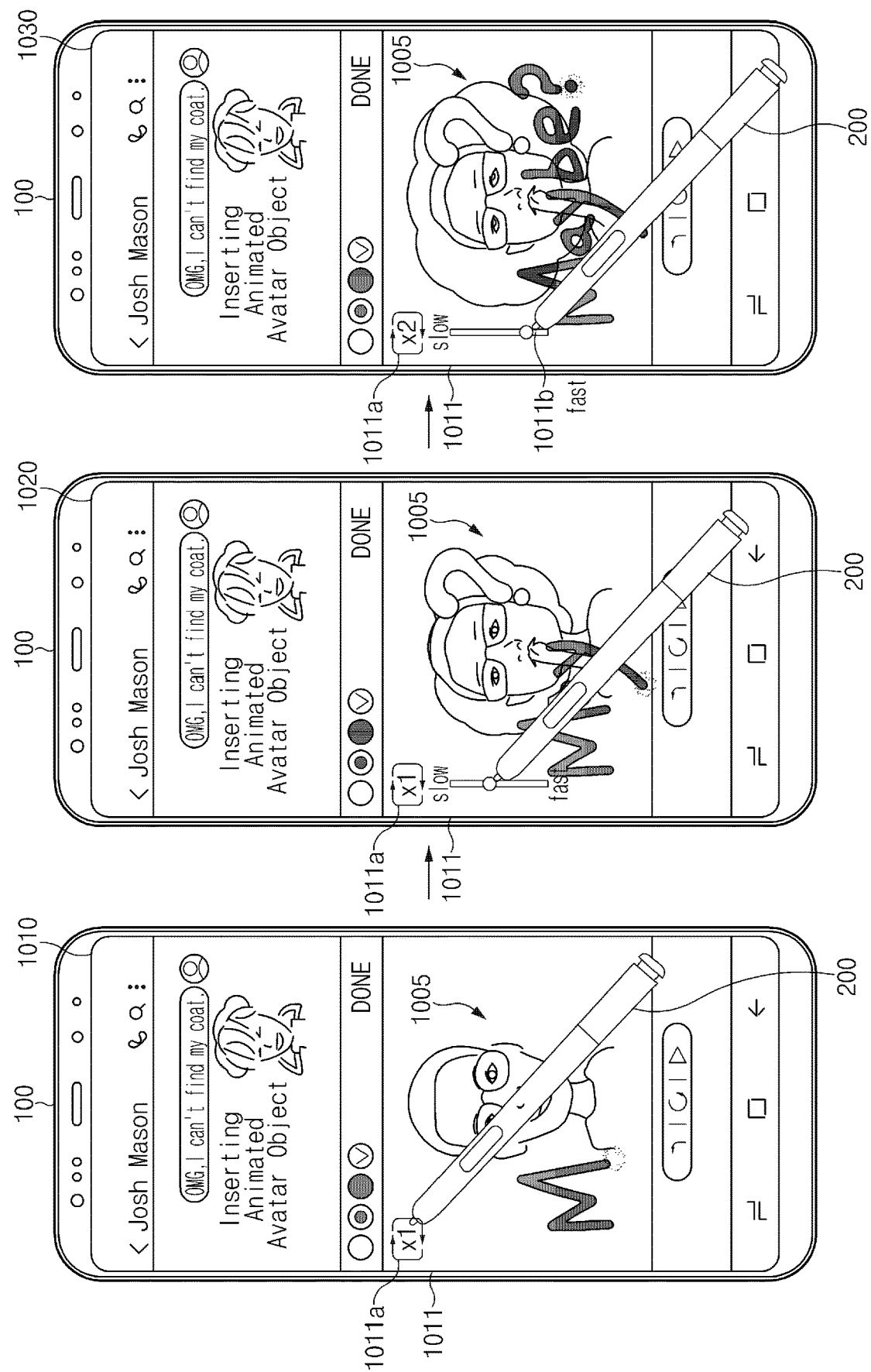
FIG. 10B illustrates a method of changing a playback speed of an animated image object generated through a user interface (UI) for generating an animated message of an electronic apparatus, according to an embodiment.

FIG. 10B illustrates a method of changing a playback speed of an animated image object generated through a UI for generating an animated message of an electronic apparatus, according to an embodiment.

Referring to FIG. 10B, in screen 1010, the electronic apparatus 100 may receive a user input (e.g., a touch input) to change the playback speed of the generated third animated image object 1005. For example, the electronic apparatus 100 may receive a user input to change a playback speed via an indicator 1011*a* indicating the playback speed displayed in a drawing window 1011.

In screen 1020, the electronic apparatus 100 may display a playback speed control bar 1011*b* for setting the playback speed of the third animated image object 1005, in the drawing window 1011.

In screen 1030, the electronic apparatus 100 may receive a user input (e.g., a drag input) to set the playback speed, via the playback speed control bar 1011*b*. As such, the electronic apparatus 100 may change a first playback speed (e.g., 1× speed) of the third animated image object 1005 to a second playback speed (e.g., 2× speed). The electronic apparatus 100 may generate a message including the third animated image object 1005 of which the playback speed is changed.

Figure 11A:
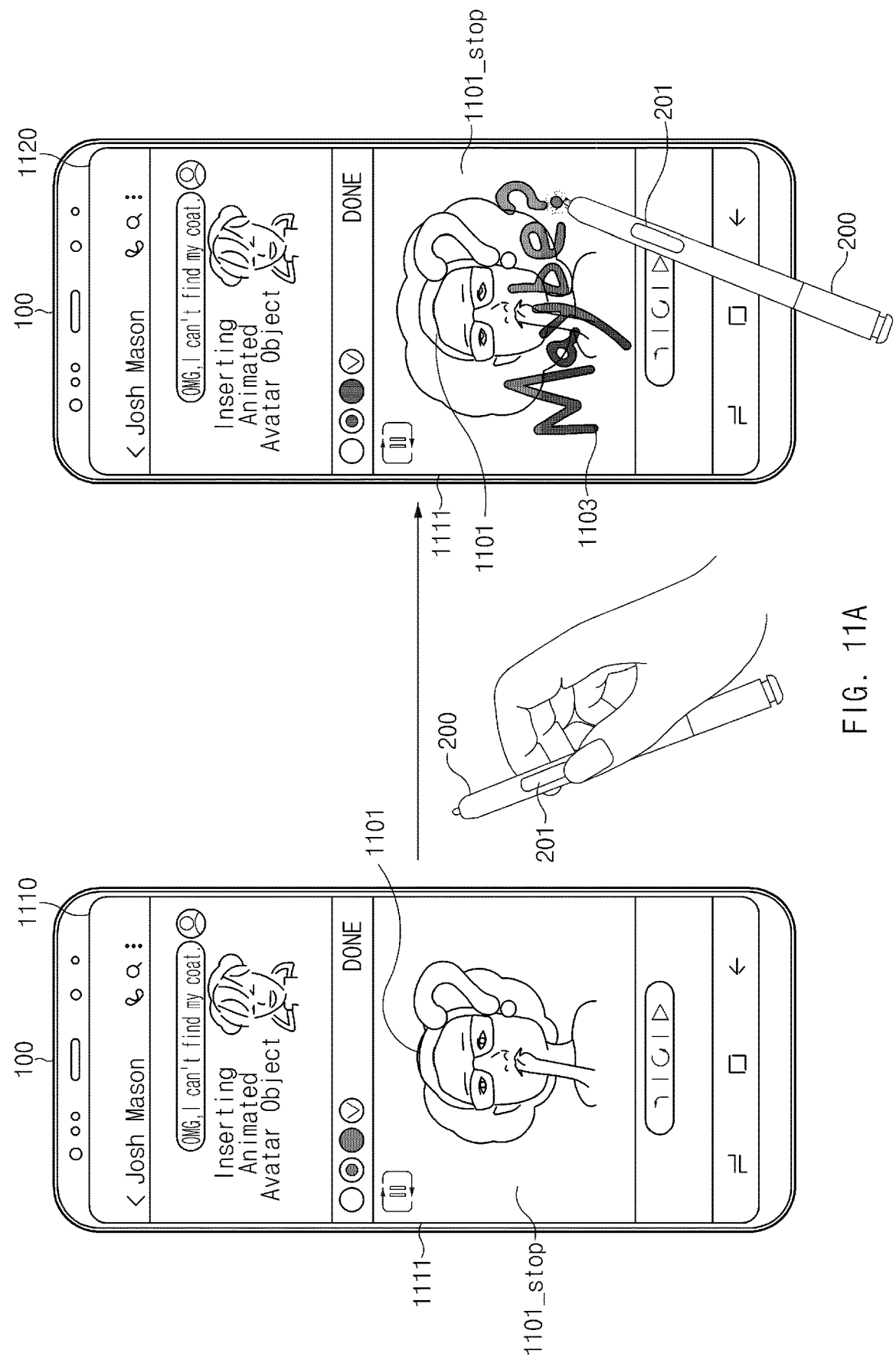
FIG. 11A illustrates a method of generating an animated message based on an image frame obtained by receiving a drawing input of an electronic apparatus, according to an embodiment.
Figure 11B:
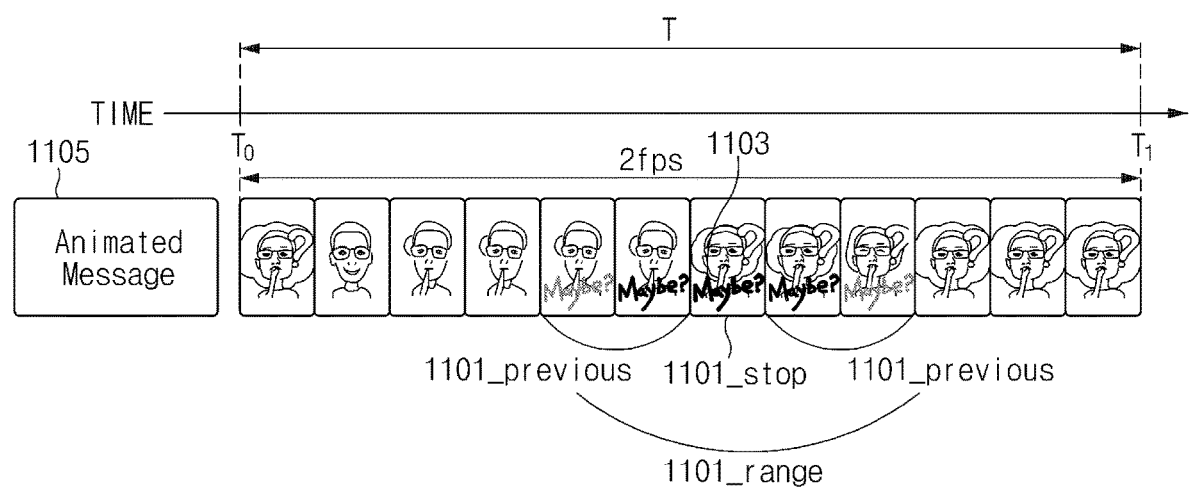
FIG. 11B illustrates a method of generating an animated message based on an image frame obtained by receiving a drawing input of an electronic apparatus, according to an embodiment.

FIGS. 11A and 11B illustrate a method of generating an animated message based on an image frame obtained by receiving a drawing input of an electronic apparatus, according to an embodiment.

Referring to FIG. 11A, when the specified image frame of a first animated image object 1101 is displayed in a drawing window 1111, the electronic apparatus 100 may receive a drawing input.

In screen 1110, the electronic apparatus 100 may play the first animated image object 1101 for composing, in the drawing window 1111. The electronic apparatus 100 may receive a user input (e.g., a button input) to interrupt the playback of the first animated image object 1101, via the button 201 of the digital pen 200. The electronic apparatus 100 may display a specified image frame 1101_stop in the drawing window 1111.

In screen 1120, the electronic apparatus 100 may receive a drawing input in a state where the specified image frame 1101_stop is displayed in the drawing window 1111. The electronic apparatus 100 may display a drawing object (or a second animated image object) 1103 by the drawing input, in the drawing window 1111.

Referring to FIG. 11B, the drawing object 1103 displayed on the electronic apparatus 100 may fade in or out before and after the image frame 1101_stop into which a drawing input is entered.

The electronic apparatus 100 may generate a third animated image object 1105 such that the drawing object 1103 entered into a frame 1101_range within a specified range is displayed with respect to the image frame 1101_stop of the first animated image object 1101 into which the drawing input is entered. For example, the electronic apparatus 100 may compose an image frame including the drawing object 1103 so as to be faded in from a previous image frame 1101_previous of the image frame 1101_stop of the first animated image object 1101 into which the drawing input is entered. The electronic apparatus 100 may compose an image frame including the drawing object 1103 so as to be faded out from a later image frame 1101_later of the image frame 1101_stop of the first animated image object 1101 into which the drawing input is entered.

Figure 12:
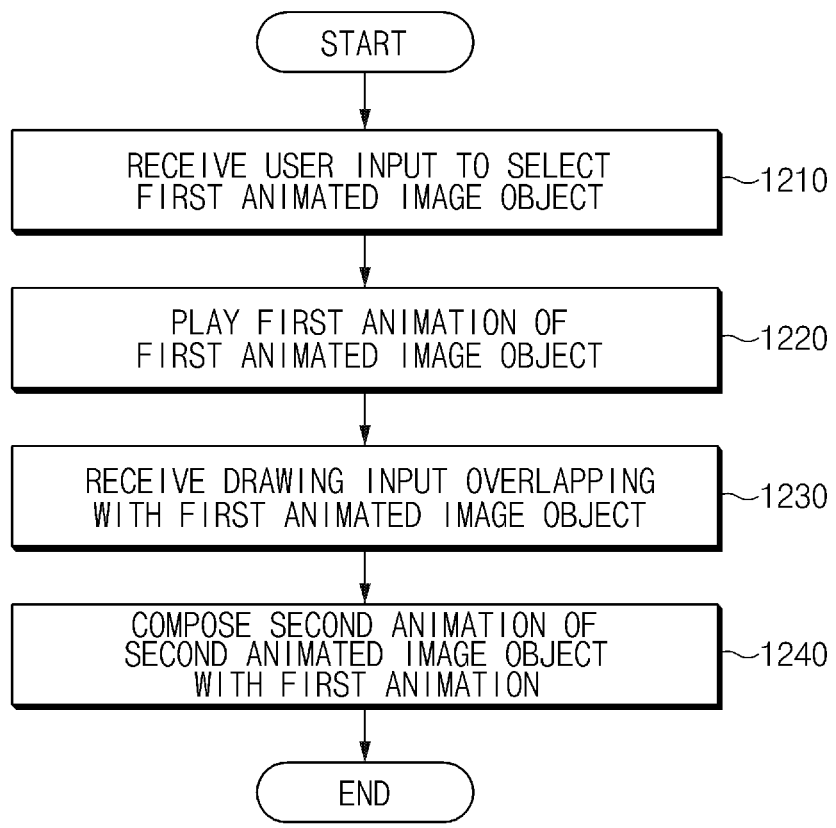
FIG. 12 is a flowchart illustrating a method of generating an animated message in an electronic apparatus, according to an embodiment.

FIG. 12 is a flowchart illustrating a method of generating an animated message in an electronic apparatus, according to an embodiment.

The flowchart illustrated in FIG. 12 may be composed of operations processed by the above-described electronic apparatus (e.g., the electronic apparatus 100) and may indicate a method in which the electronic apparatus 100 composes an animated message by composing a plurality of animated image objects. Detailed descriptions about the electronic device described with reference to FIGS. 1 to 11 may be applied to the flowchart shown in FIG. 12.

In step 1210, the electronic apparatus 100 (e.g., the processor 150 of FIG. 2) receives a user input (e.g., a touch input) to select a first animated image object. The first animated image object may be stored in a memory (e.g., the memory 140 of FIG. 2).

In step 1220, the electronic apparatus 100 plays the first animation of the first animated image object on a display 130. The first animation may be played in a drawing window of a message app.

In step 1230, the electronic apparatus 100 receives a drawing input overlapping with the first animated image object, via the display (or a touchscreen display) 130. The electronic apparatus 100 may receive the drawing input via the drawing window in which the first animated image object is played.

In step 1240, the electronic apparatus 100 generates a third animated image object obtained by composing a second animation of the second animated image object by using the drawing input with the first animation. The electronic apparatus 100 may generate the third animated image object including a plurality of image frames obtained by composing the first animation and the second animation, which are synchronized based on a point in time when the drawing input is entered. In addition, the electronic apparatus 100 may generate the second animated image object including a plurality of image frames obtained by composing the first animation and the second animation, which are synchronized based on the playback time of the first animation.

Accordingly, when generating an animated message including a third animated object image obtained by composing a first animated image object and a second animated image object by using a drawing input, the electronic apparatus 100 may synchronize the first animated image object and the second animated image object by using the drawing input, and thus drawing objects by using the drawing input may smoothly and naturally be played on the first animated image object that is repeatedly played during one cycle.

The electronic apparatus 100 may generate an animated message including the third animated image object with a small data size, by generating the third animated image object using only the plurality of frames of one cycle of the first animated image object.

Figure 13:
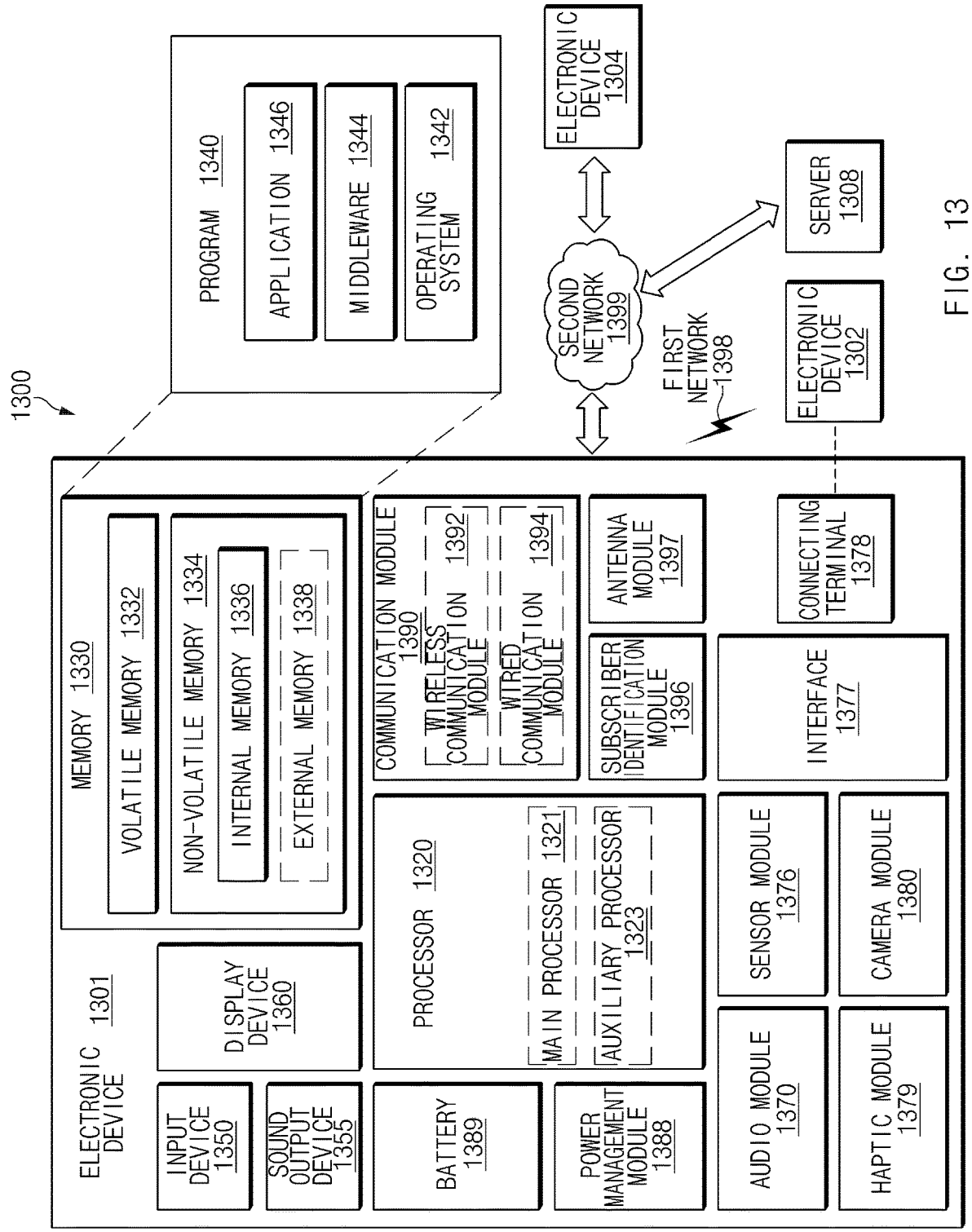
FIG. 13 illustrates a block diagram of an electronic device in a network environment, according to various embodiments.

FIG. 13 is a block diagram illustrating an electronic device 1301 in a network environment 1300 according to various embodiments. Referring to FIG. 13, the electronic device 1301 in the network environment 1300 may communicate with an electronic device 1302 via a first network 1398 (e.g., a short-range wireless communication network), or an electronic device 1304 or a server 1308 via a second network 1399 (e.g., a long-range wireless communication network). According to an embodiment, the electronic device 1301 may communicate with the electronic device 1304 via the server 1308. According to an embodiment, the electronic device 1301 may include a processor 1320, memory 1330, an input device 1350, a sound output device 1355, a display device 1360, an audio module 1370, a sensor module 1376, an interface 1377, a haptic module 1379, a camera module 1380, a power management module 1388, a battery 1389, a communication module 1390, a subscriber identification module (SIM) 1396, or an antenna module 1397. In some embodiments, at least one (e.g., the display device 1360 or the camera module 1380) of the components may be omitted from the electronic device 1301, or one or more other components may be added in the electronic device 1301. In some embodiments, some of the components may be implemented as single integrated circuitry. For example, the sensor module 1376 (e.g., a fingerprint sensor, an iris sensor, or an illuminance sensor) may be implemented as embedded in the display device 1360 (e.g., a display).

The processor 1320 may execute, for example, software (e.g., a program 1340) to control at least one other component (e.g., a hardware or software component) of the electronic device 1301 coupled with the processor 1320, and may perform various data processing or computation. According to one embodiment, as at least part of the data processing or computation, the processor 1320 may load a command or data received from another component (e.g., the sensor module 1376 or the communication module 1390) in volatile memory 1332, process the command or the data stored in the volatile memory 1332, and store resulting data in non-volatile memory 1334. According to an embodiment, the processor 1320 may include a main processor 1321 (e.g., a central processing unit (CPU) or an application processor (AP)), and an auxiliary processor 1323 (e.g., a graphics processing unit (GPU), an image signal processor (ISP), a sensor hub processor, or a communication processor (CP)) that is operable independently from, or in conjunction with, the main processor 1321. Additionally or alternatively, the auxiliary processor 1323 may be adapted to consume less power than the main processor 1321, or to be specific to a specified function. The auxiliary processor 1323 may be implemented as separate from, or as part of the main processor 1321.

The auxiliary processor 1323 may control at least some of functions or states related to at least one component (e.g., the display device 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). According to an embodiment, the auxiliary processor 1323 (e.g., an image signal processor or a communication processor) may be implemented as part of another component (e.g., the camera module 1380 or the communication module 1390) functionally related to the auxiliary processor 1323.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input device 1350 may receive a command or data to be used by other component (e.g., the processor 1320) of the electronic device 1301, from the outside (e.g., a user) of the electronic device 1301. The input device 1350 may include, for example, a microphone, a mouse, a keyboard, or a digital pen (e.g., a stylus pen).

The sound output device 1355 may output sound signals to the outside of the electronic device 1301. The sound output device 1355 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1360 may visually provide information to the outside (e.g., a user) of the electronic device 1301. The display device 1360 may include, for example, a display, a hologram device, or a projector and control circuitry to control a corresponding one of the display, hologram device, and projector. According to an embodiment, the display device 1360 may include touch circuitry adapted to detect a touch, or sensor circuitry (e.g., a pressure sensor) adapted to measure the intensity of force incurred by the touch.

The audio module 1370 may convert a sound into an electrical signal and vice versa. According to an embodiment, the audio module 1370 may obtain the sound via the input device 1350, or output the sound via the sound output device 1355 or a headphone of an external electronic device (e.g., an electronic device 1302) directly (e.g., wiredly) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the electronic device 1302) directly (e.g., wiredly) or wirelessly. According to an embodiment, the interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device (e.g., the electronic device 1302). According to an embodiment, the connecting terminal 1378 may include, for example, a HDMI connector, a USB connector, a SD card connector, or an audio connector (e.g., a headphone connector).

The haptic module 1379 may convert an electrical signal into a mechanical stimulus (e.g., a vibration or a movement) or electrical stimulus which may be recognized by a user via his tactile sensation or kinesthetic sensation. According to an embodiment, the haptic module 1379 may include, for example, a motor, a piezoelectric element, or an electric stimulator.

The camera module 1380 may capture a still image or moving images. According to an embodiment, the camera module 1380 may include one or more lenses, image sensors, image signal processors, or flashes.

The power management module 1388 may manage power supplied to the electronic device 1301. According to one embodiment, the power management module 1388 may be implemented as at least part of, for example, a power management integrated circuit (PMIC).

The battery 1389 may supply power to at least one component of the electronic device 1301. According to an embodiment, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the application processor (AP)) and supports a direct (e.g., wired) communication or a wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™, wireless-fidelity (Wi-Fi) direct, or infrared data association (IrDA)) or the second network 1399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., international mobile subscriber identity WSW stored in the subscriber identification module 1396.

The antenna module 1397 may transmit or receive a signal or power to or from the outside (e.g., the external electronic device) of the electronic device 1301. According to an embodiment, the antenna module 1397 may include an antenna including a radiating element composed of a conductive material or a conductive pattern formed in or on a substrate (e.g., PCB). According to an embodiment, the antenna module 1397 may include a plurality of antennas. In such a case, at least one antenna appropriate for a communication scheme used in the communication network, such as the first network 1398 or the second network 1399, may be selected, for example, by the communication module 1390 (e.g., the wireless communication module 1392) from the plurality of antennas. The signal or the power may then be transmitted or received between the communication module 1390 and the external electronic device via the selected at least one antenna. According to an embodiment, another component (e.g., a radio frequency integrated circuit (RFIC)) other than the radiating element may be additionally formed as part of the antenna module 1397.

At least some of the above-described components may be coupled mutually and communicate signals (e.g., commands or data) there between via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1301 and the external electronic device 1304 via the server 1308 coupled with the second network 1399. Each of the electronic devices 1302 and 1304 may be a device of a same type as, or a different type, from the electronic device 1301. According to an embodiment, all or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, or client-server computing technology may be used, for example.

Figure 14:
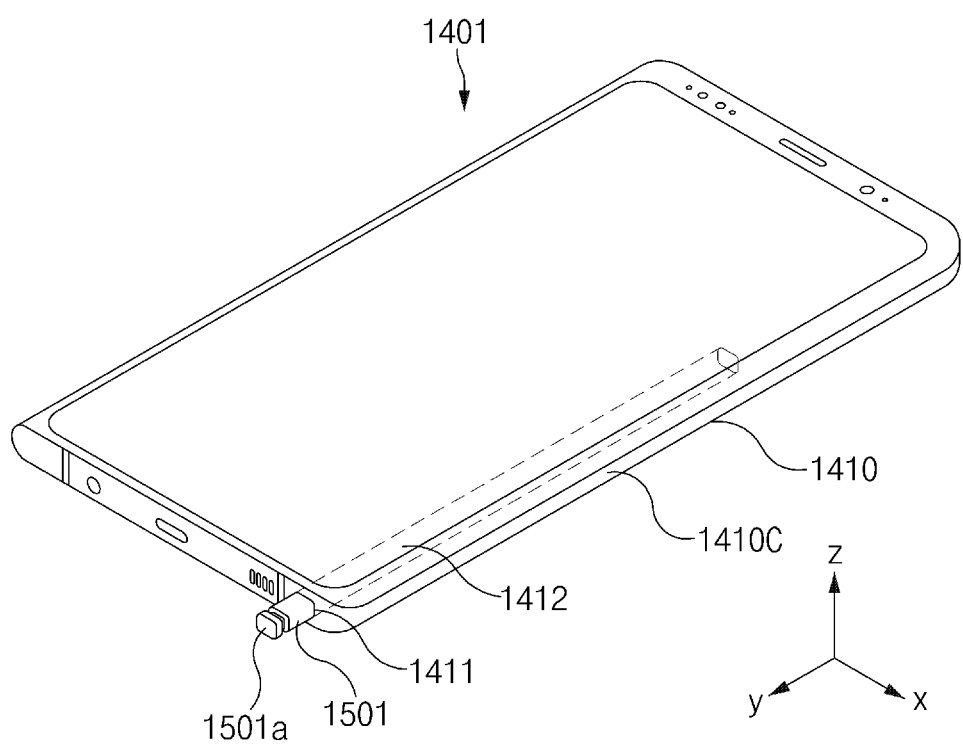
FIG. 14 is a perspective view of an electronic apparatus including a digital pen, according to an embodiment.

FIG. 14 is a perspective view of an electronic apparatus including a digital pen, according to an embodiment.

Referring to FIG. 14, an electronic apparatus 1401 may include the components illustrated in FIG. 13 and may include a structure in which a digital pen 1501 (e.g., a stylus pen) is capable of being inserted. The electronic apparatus 1401 includes housing 1410, and a hole 1411 in a portion of the housing, such as a portion of a side surface 1410C. The electronic apparatus 1401 includes a storage space 1412 connected to the hole 1411, and the digital pen 1501 may be inserted into the storage space 1412. The digital pen 1501 includes a pressable button 1501a at one end such that it is easy to remove the digital pen 1501 from the storage space 1412 of the electronic apparatus 1401. When the button 1501a is pressed, the repulsion mechanism (e.g., at least one spring) configured to be associated with the button 1501a may operate to remove the digital pen 1501 from the storage space 1412.

Figure 15:
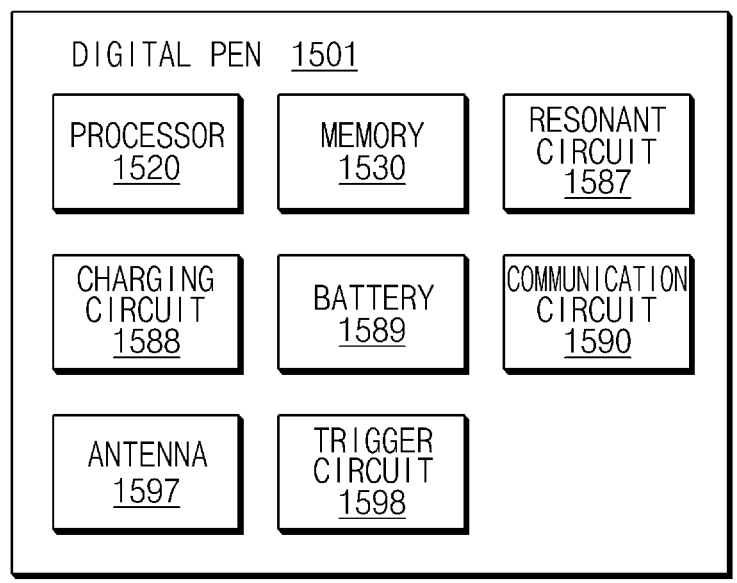
FIG. 15 is a block diagram illustrating a digital pen, according to an embodiment.

FIG. 15 is a block diagram illustrating a digital pen, according to an embodiment.

Referring to FIG. 15, the digital pen 1501 includes a processor 1520, a memory 1530, a resonant circuit 1587, a charging circuit 1588, a battery 1589, a communication circuit 1590, an antenna 1597, and/or a trigger circuit 1598. The processor 1520, at least part of the resonant circuit 1587, and/or at least part of the communication circuit 1590 of the digital pen 1501 may be implemented in a chip form or on a printed circuit board (PCB). The processor 1520, the resonant circuit 1587, and/or the communication circuit 1590 may be electrically connected to the memory 1530, the charging circuit 1588, the battery 1589, the antenna 1597, or the trigger circuit 1598. The digital pen 1501 may be composed of only a resonant circuit and a button.

The processor 1520 may include a generic processor configured to execute customized hardware modules or software (e.g., application programs). The processor may include a hardware component (function) or a software component (program) including at least one of various sensors, a data measurement module, an input/output interface, a module managing the state or environment of the digital pen 1501, or a communication module, which is included in the digital pen 1501. For example, the processor 1520 may include one or more combinations of hardware, software, and firmware. The processor 1520 may receive a proximity signal corresponding to an electromagnetic field signal generated from a digitizer of the electronic apparatus 1401, via the resonant circuit 1587. When the proximity signal is identified, the processor 1520 may control the resonant circuit 1587 to transmit an electro-magnetic resonance (EMR) input signal to the electronic apparatus 1401.

The memory 1530 may store information associated with the operation of the digital pen 1501. The information may include information for communication with the electronic apparatus 1401 and frequency information associated with the input operation of the digital pen 1501.

The resonant circuit 1587 may include at least one of a coil, an inductor, or a capacitor. The resonant circuit 1587 may be used for the digital pen 1501 to generate a signal including the resonant frequency. For example, for the purpose of generating the signal, the digital pen 1501 may use at least one of an EMR scheme, an active electrostatic (AES) scheme, or an electrically coupled resonance (ECR) scheme. When the digital pen 1501 transmits a signal in the EMR scheme, the digital pen 1501 may generate the signal including the resonance frequency, based on the electromagnetic field generated from the inductive panel of the electronic apparatus 1401. When the digital pen 1501 transmits a signal in the AES scheme, the digital pen 1501 may generate the signal using capacity coupling with the electronic apparatus 1401. When the digital pen 1501 transmits a signal in the ECR scheme, the digital pen 1501 may generate the signal including a resonance frequency, based on the electric field generated from the capacitive device of the electronic apparatus. The resonant circuit 1587 may be used to change the intensity or frequency of the electromagnetic field based on the user's manipulation state. For example, the resonant circuit 1587 may provide a frequency for recognizing a hovering input, a drawing input, a button input, or an erasing input.

When the charging circuit 1588 is connected to the resonant circuit 1587 based on a switching circuit, the charging circuit 1588 may rectify the resonant signal generated from the resonant circuit 1587 to a direct current (DC) signal to provide the DC signal to the battery 1589. The digital pen 1501 may determine whether the digital pen 1501 is inserted in the electronic apparatus 1401, using the voltage level of the DC signal detected by the charging circuit 1588.

The battery 1589 may be configured to store the power required for the operation of the digital pen 1501. The battery 1589 may include a lithium-ion battery or a capacitor and may be rechargeable or replaceable. The battery 1589 may be charged using the power (e.g., a DC signal (DC power)) supplied from the charging circuit 1588.

The communication circuit 1590 may be configured to perform the wireless communication function between the digital pen 1501 and the communication module 1390 of the electronic apparatus 1401. The communication circuit 1590 may transmit state information and input information of the digital pen 1501, to the electronic apparatus 1401 using a short range communication scheme. The communication circuit 1590 may transmit the direction information (e.g., motion sensor data) of the digital pen 1501 obtained via the trigger circuit 1598, the voice information entered via the microphone, or the level information of the battery 1589 to the electronic apparatus 1401. The short range communication scheme may include at least one of Bluetooth, Bluetooth low energy (BLE), or wireless LAN.

The antenna 1597 may be used to transmit a signal or power to the outside (e.g., the electronic apparatus 1401) or to receive a signal or power from the outside. The digital pen 1501 may include the plurality of antennas 1597 and may select at least one antenna 1597, which is suitable for the communication scheme, from among the plurality of antennas 1597. The communication circuit 1590 may exchange the signal or power with an external electronic apparatus through the selected at least one antenna 1597.

The trigger circuit 1598 may include at least one button or sensor circuit. The processor 1520 may identify the input method (e.g., touch or pressed) or type (e.g., an EMR button or BLE button) of the button of the digital pen 1501. The sensor circuit may generate an electrical signal or a data value which corresponds to an internal operation state or an external environment state of the digital pen 1501. The sensor circuit may include at least one of a motion sensor, a battery level sensor, a pressure sensor, an optical sensor, a temperature sensor, a geomagnetic sensor, and a biometric sensor. The trigger circuit 1598 may transmit the trigger signal to the electronic apparatus 1401, using the input signal of the button or a sensor to transmit the signal.

Figure 16:
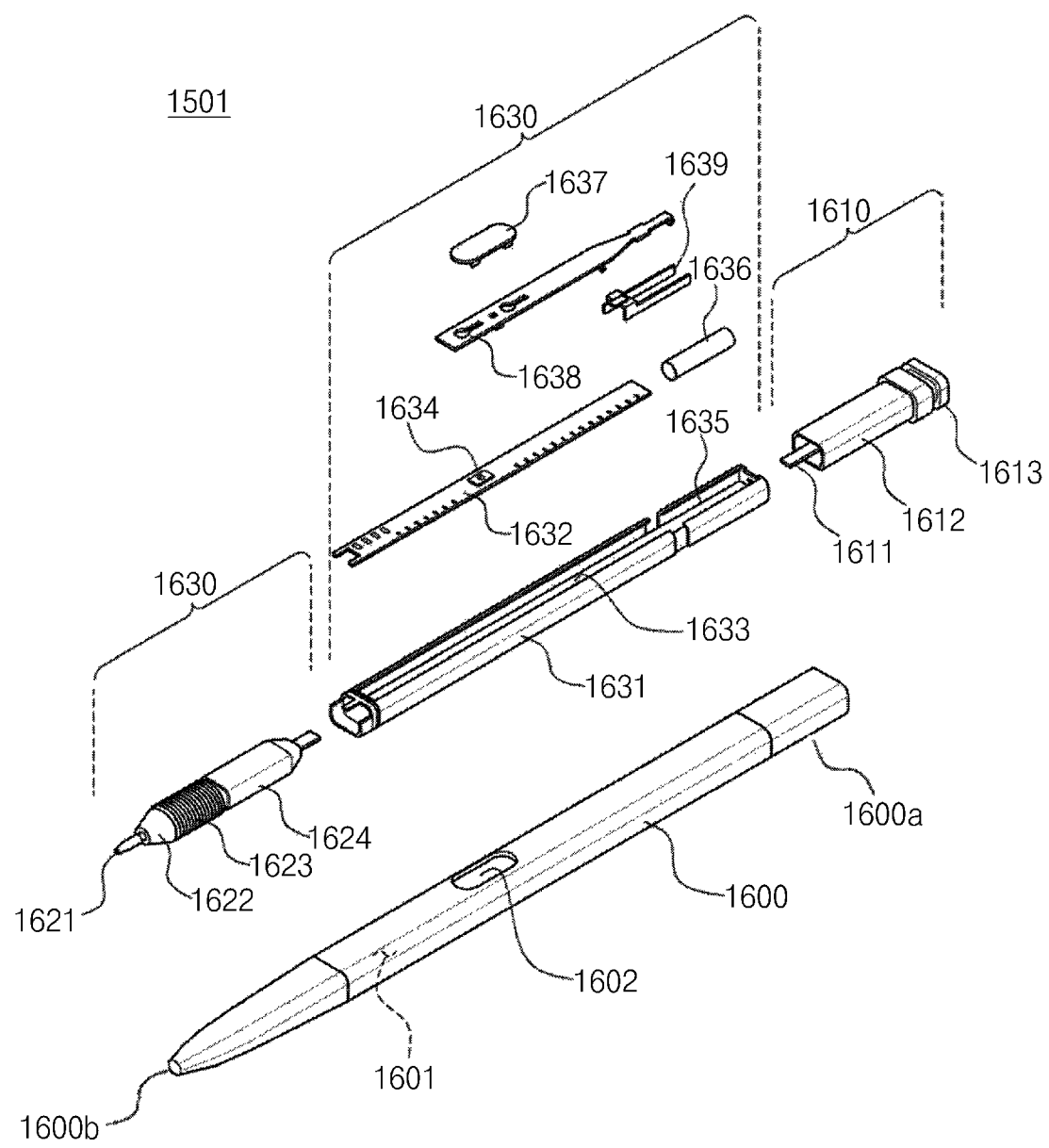
FIG. 16 is an exploded perspective view of a digital pen, according to an embodiment.

FIG. 16 is an exploded perspective view of a digital pen, according to an embodiment.

Referring to FIG. 16, the digital pen 1501 includes a pen housing 1600 forming the exterior appearance of the digital pen 1501 and an inner assembly inside the pen housing 1600. The inner assembly may include various components mounted inside the pen and may be inserted into the pen housing 1600 in a single assembly operation.

The pen housing 1600 may have a shape elongated between a first end 1600*a* and a second end 1600*b* and includes a storage space 1601 therein. The cross section of the pen housing 1600 may be an elliptical shape having a long axis and a short axis, and the pen housing 1600 may be formed as an elliptical column as a whole. The storage space 1412 of the electronic apparatus 1401 may also have an elliptical cross section so as to correspond to the shape of the pen housing 1600. The pen housing 1600 may include a synthetic resin (e.g., plastic) and/or a metallic material (e.g., aluminum). The second end 1600*b* of the pen housing 1600 may be formed of synthetic resin.

The inner assembly may have an elongated shape so as to correspond to the shape of the pen housing 1600. The inner assembly may be roughly divided into three major configurations along the length direction. The inner assembly may include an ejection member 1610 disposed at a location corresponding to the first end 1600*a* of the pen housing 1600, a coil part 1620 disposed at a location corresponding to the second end 1600*b* of the pen housing 1600, and a circuit substrate part 1630 disposed at a location corresponding to the body of the housing.

The ejection member 1610 may include a configuration for ejecting the digital pen 1501 from the storage space 1412 of the electronic apparatus 1401. The ejection member 1610 may include a shaft 1611, an ejection body 1612, which is disposed at the circumference of the shaft 1611 and forming the overall appearance of the ejection member 1610, and a button part 1613. When the inner assembly is completely inserted into the pen housing 1600, the portion including the shaft 1611 and the ejection body 1612 may be surrounded by the first end 1600*a* of the pen housing 1600, and the button part 1613 (e.g., 201*a* of FIG. 2) may be exposed to the outside of the first end 1600*a*. A plurality of components (e.g., cam members or resilient members) may be disposed inside the ejection body 1612 to form a push-pull structure. The button part 1613 may be substantially coupled to the shaft 1611 and may perform a linear reciprocating motion on the ejection body 1612. The button part 1613 may include a button having a hook structure that allows a user to pull out the digital pen 1501 using a fingernail. The digital pen 1501 may provide another input method, by including a sensor that detects the linear reciprocating motion of the shaft 1611.

When the inner assembly is fully inserted into the pen housing 1600, the coil part 1620 may include a pen tip 1621 exposed to the outside of the second end 1600*b*, a packing ring 1622, a coil 1623 wound a plurality of times, and/or a writing pressure sensing part 1624 for obtaining the change in pressure according to the pressure of the pen tip 1621. The packing ring 1622 may include epoxy, rubber, urethane, or silicone. The packing ring 1622 may be provided for waterproof and dust-proof and may protect the coil part 1620 and the circuit substrate part 1630 from water or dust. The coil 1623 may form a resonant frequency in a set frequency band (e.g., 500 kHz) and may be coupled to an at least one element (e.g., capacitor) to adjust the resonance frequency formed by the coil 1623 within a specific range.

The circuit substrate part 1630 includes a PCB 1632, a base 1631 surrounding at least one side surface of the PCB 1632, and an antenna. A substrate seating part 1633 on which the PCB 1632 is disposed may be formed on an upper surface of the base 1631, and the PCB 1632 may be fixed in a state where the PCB 1632 is seated on the substrate seating part 1633. The PCB 1632 may include a top surface and a bottom surface; a variable capacitor connected to the coil 1623 or a switch 1634 may be disposed on the top surface; a charging circuit, a battery, or a communication circuit may be disposed on the bottom surface. The battery may include an electric double layered capacitor (EDLC). The charging circuit may be positioned between the coil 1623 and a battery and may include voltage detector circuitry and a rectifier.

The antenna may include an antenna structure 1639 and/or an antenna embedded in the PCB 1632, as illustrated in FIG. 16. The switch 1634 may be provided on the PCB 1632. A side button 1637 provided in the digital pen 1501 may be used to press the switch 1634 and may be exposed to the outside through a side opening 1602 of the pen housing 1600. When there is no external force acting on the side button 1637 while the side button 1637 is supported by a support member 1638, the support member 1638 may provide the elastic restoring force such that the side button 1637 is restored or maintained in a state where the side button 1637 is disposed at a specific location.

The circuit substrate part 1630 may include another packing ring such as an O-ring. For example, the O-ring made of an elastic body may be disposed at opposite ends of the base 1631 to form a sealing structure between the base 1631 and the pen housing 1600. The support member 1638 may form a sealing structure by partially contacting the inner wall of the pen housing 1600 around the side opening 1602. The circuit substrate part 1630 may also form a water-proof and dust-proof structure similar to the structure of the packing ring 1622 of the coil part 1620.

The digital pen 1501 includes a battery seating part 1635 in which a battery 1636 is disposed on an upper surface of the base 1631. For example, the battery 1636 may be capable of being mounted on the battery seating part 1635 and may be a cylinder-type battery.

The digital pen 1501 may include a microphone that may be directly connected to the printed circuit board 1632 or may be connected to a separate flexible PCB (FPCB) connected to the PCB 1632. The microphone may be disposed in the long direction of the digital pen 1501 so as to be parallel to the side button 1637.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1340) including one or more instructions that are stored in a storage medium (e.g., internal memory 1336 or external memory 1338) that is readable by a machine (e.g., the electronic device 1301). For example, a processor (e.g., the processor 1320) of the machine (e.g., the electronic device 1301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

When generating an animated message including a third animated object image by composing a first animated image object and a second animated image object by using a drawing input, an electronic apparatus may synchronize the first animated image object and the second animated image object by using the drawing input, and thus drawing objects by using the drawing input may smoothly and naturally be played on the first animated image object that is repeatedly played, or played during one cycle.

The electronic apparatus may generate an animated message including the third animated image object with a small data size, by generating the third animated image object using only the plurality of frames of one cycle of the first animated image object.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic apparatus, comprising:
   a housing;
   a touchscreen display that is visible or exposed through a portion of the housing;
   a wireless communication circuit;
   a processor operatively connected to the touchscreen display and the wireless communication circuit; and
   a memory operatively connected to the processor,
   wherein the memory stores instructions that, when executed, instruct the processor to:
   receive an input to select a first animated image object, via the touchscreen display,
   play a first animation of the first animated image object on the touchscreen display at least once,
   receive a drawing input overlapping with the first animated image object, via the touchscreen display on which the first animation is played, and
   obtain a third animated image object by composing a second animation of a second animated image object by the drawing input with the first animation, and
   wherein the third animated image object includes a plurality of image frames obtained by synchronizing the first animation and the second animation based on a time point when the drawing input is entered.

2. The electronic apparatus of claim 1, wherein each of the first animated image object, the second animated image object, and the third animated image object has a graphics interchange format (GIF) or Motion Picture Experts Group (MPEG)-4 Part 14 (MP4) file format.

3. The electronic apparatus of claim 1, wherein each of the first animated image object and the second animated image object includes a plurality of image frames, and
   wherein at least one of a number of playback image frames and a playback time is different.

4. The electronic apparatus of claim 1, wherein the instructions further instruct the processor to:
   synchronize the first animation and the second animation by matching a plurality of image frames of the second animated image object to a plurality of image frames in which the first animated image object is repeated, and
   generate the third animated image object by composing the plurality of image frames of the first animated image object with the plurality of image frames of the second animated image object to correspond to each other.

5. The electronic apparatus of claim 4, wherein the instructions further instruct the processor to:
   when a playback speed of the first animated image object is different from a playback speed of the second animated image object, match at least one image frame of the first animated image object, which is displayed on the touchscreen display after a time point corresponding to the last image frame of the second animated image object, to a last image frame.

6. The electronic apparatus of claim 4, wherein the instructions further instruct the processor to:
   match an image frame of the first animated image object displayed on the touchscreen display to an image frame for the drawing input entered, until a time point when the image frame is displayed.

7. The electronic apparatus of claim 6, wherein the instructions further instruct the processor to:
   when contact of the touchscreen display by the drawing input is detected, sequentially display the plurality of image frames of the first animated image object on the touchscreen display, and
   when the contact of the touchscreen display by the drawing input is not detected, continuously display an image frame of the first animated image object displayed on the touchscreen display, at a time point when the contact is not detected.

8. The electronic apparatus of claim 6, wherein the instructions further instruct the processor to:
   when receiving a specified signal via the wireless communication circuit, continuously display an image frame of the first animated image object displayed on the touchscreen display, at a time point when the signal is received.

9. The electronic apparatus of claim 8, wherein the drawing input is entered when the image frame is continuously displayed on the touchscreen display.

10. The electronic apparatus of claim 1, wherein the instructions further instruct the processor to:
    determine whether to repeatedly play the first animated image object, at a start time point and an end time point of at least one stroke input included in the drawing input, and
    based on the determination, generate the third animated image object.

11. The electronic apparatus of claim 1, wherein the instructions further instruct the processor to:
    transmit the third animated image object to an external electronic apparatus via the wireless communication circuit.

12. The electronic apparatus of claim 1, wherein the instructions further instruct the processor to:
    display a graphic user interface (GUI) for receiving the drawing input on the touchscreen display; and
    display an animation of the first animated image object on the GUI.

13. An electronic apparatus, comprising:
    a housing;
    a touchscreen display that is visible or exposed through a portion of the housing;
    a wireless communication circuit;
    a processor operatively connected to the touchscreen display and the wireless communication circuit; and
    a memory operatively connected to the processor, wherein the memory stores instructions that, when executed, instruct the processor to:
- receive an input to select a first animated image object, via the touchscreen display,
- play a first animation of the first animated image object on the touchscreen display at least once,
- receive a drawing input overlapping with the first animated image object, via the touchscreen display on which the first animation is played, and
- cause a third animated image object, which is obtained by composing a second animation of a second animated image object by the drawing input with the first animation, to be generated, wherein the third animated image object includes a plurality of image frames that are obtained by synchronizing the first animation and the second animation based on a playback time of the first animation.

14. The electronic apparatus of claim 13, wherein each of the first animated image object, the second animated image object, and the third animated image object has a graphics interchange format (GIF) or Motion Picture Experts Group (MPEG)-4 Part 14 (MP4) file format.

15. The electronic apparatus of claim 13, wherein each of the first animated image object and the second animated image object includes a plurality of image frames, and
wherein at least one of a number of playback image frames and a playback time is different.

16. The electronic apparatus of claim 13, wherein the instructions further instruct the processor to:
- synchronize the first animation and the second animation by matching a plurality of image frames of the second animated image object to a plurality of image frames of the first animated image object, and
- generate the third animated image object by composing the plurality of image frames of the first animated image object with the plurality of image frames of the second animated image object to correspond to each other.

17. The electronic apparatus of claim 16, wherein the instructions further instruct the processor to:
- determine a playback speed of the first animated image object, based on an input time of the drawing input,
- generate the plurality of image frames of the second animated image object, of which a number of frames is the same as the number of the plurality of image frames of the first animated image object, and
- match the plurality of image frames of the first animated image object to the plurality of image frames of the second animated image object, respectively.

18. The electronic apparatus of claim 16, wherein the third animated image object has the determined playback time.

19. The electronic apparatus of claim 13, wherein the instructions further instruct the processor to:
- transmit the third animated image object to an external electronic apparatus via the wireless communication circuit.

20. The electronic apparatus of claim 13, wherein the instructions further instruct the processor to:
- display a graphic user interface (GUI) for receiving the drawing input on the touchscreen display; and
- display an animation of the first animated image object on the GUI.

* * * * *